United States Patent
Saitoh et al.

(10) Patent No.: US 12,025,820 B2
(45) Date of Patent: Jul. 2, 2024

(54) TRANSMISSIVE LIQUID CRYSTAL DIFFRACTION ELEMENT

(71) Applicant: FUJIFILM Corporation, Tokyo (JP)

(72) Inventors: Yukito Saitoh, Minamiashigara (JP); Hiroshi Sato, Minamiashigara (JP); Takashi Yonemoto, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/541,062

(22) Filed: Dec. 15, 2023

(65) Prior Publication Data

US 2024/0134098 A1 Apr. 25, 2024

Related U.S. Application Data

(63) Continuation of application No. PCT/JP2022/023231, filed on Jun. 9, 2022.

(30) Foreign Application Priority Data

Jun. 16, 2021 (JP) ................................. 2021-100266

(51) Int. Cl.
*G02B 5/18* (2006.01)

(52) U.S. Cl.
CPC ................. *G02B 5/1866* (2013.01)

(58) Field of Classification Search
CPC .................................................. G02B 5/1866

(Continued)

(56) References Cited

U.S. PATENT DOCUMENTS

| 2013/0077040 A1 | 3/2013 | Escuti et al. |
| 2021/0223448 A1 | 7/2021 | Sato et al. |

(Continued)

FOREIGN PATENT DOCUMENTS

| JP | 2010-525394 A | 7/2010 |
| JP | 2014-89476 A | 5/2014 |

(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2022/023231, dated Dec. 28, 2023.

(Continued)

Primary Examiner — Charles S Chang
(74) Attorney, Agent, or Firm — Birch, Stewart, Kolasch & Birch, LLP

(57) ABSTRACT

Provided is a transmissive liquid crystal diffraction element that can diffract different polarized light components in the same direction and has high diffraction efficiency with respect to unpolarized light. The transmissive liquid crystal diffraction element includes first to fourth optically-anisotropic layers each of which has a liquid crystal alignment pattern in which a direction of an optical axis changes while continuously rotating in at least one in-plane direction, in which the optical axis in each of the first to the fourth optically-anisotropic layers is twisted in a thickness direction, rotation directions of the optical axes in the liquid crystal alignment patterns and twisted directions of the optical axes in the thickness direction are opposite to each other in the first optically-anisotropic layer and the second optically-anisotropic layer, rotation directions of the optical axes in the liquid crystal alignment patterns and twisted directions of the optical axes in the thickness direction are (Continued)

opposite to each other in the third optically-anisotropic layer and the fourth optically-anisotropic layer, single periods of the liquid crystal alignment patterns are the same in the first optically-anisotropic layer and the second optically-anisotropic layer, single periods of the liquid crystal alignment patterns are the same in the third optically-anisotropic layer and the fourth optically-anisotropic layer, and the single periods of the liquid crystal alignment patterns are different in the first optically-anisotropic layer and the third optically-anisotropic layer.

20 Claims, 9 Drawing Sheets

(58) Field of Classification Search
USPC .............................................. 349/73–74, 115
See application file for complete search history.

(56) References Cited

U.S. PATENT DOCUMENTS

| 2021/0231985 | A1 | 7/2021 | Sato et al. |
| 2022/0066080 | A1 | 3/2022 | Sato et al. |
| 2022/0397712 | A1* | 12/2022 | Takahashi ........... G02F 1/13363 |

FOREIGN PATENT DOCUMENTS

| WO | WO 2020/075711 A1 | 4/2020 |
| WO | WO 2020/075738 A1 | 4/2020 |
| WO | WO 2020/230556 A1 | 11/2020 |

OTHER PUBLICATIONS

International Search Report (Form PCT/ISA/210) for International Application No. PCT/JP2022/023231, dated Sep. 6, 2022, with English translation.

* cited by examiner

TRANSMISSIVE LIQUID CRYSTAL DIFFRACTION ELEMENT

CROSS-REFERENCE TO RELATED APPLICATIONS

This application is a Continuation of PCT International Application No. PCT/JP2022/023231 filed on Jun. 9, 2022, which claims priority under 35 U.S.C. § 119(a) to Japanese Patent Application No. 2021-100266 filed on Jun. 16, 2021. The above applications are hereby expressly incorporated by reference, in their entirety, into the present application.

BACKGROUND OF THE INVENTION

1. Field of the Invention

The present invention relates to a transmissive liquid crystal diffraction element that diffracts incident light.

2. Description of the Related Art

As an optical element that bends light to control a traveling direction of the light, a diffraction element is used in many optical devices or systems.

As this diffraction element, a liquid crystal diffraction element formed of a liquid crystal compound is disclosed.

For example, JP2014-089476A discloses a polarization diffraction grating including a first polarization diffraction grating layer and a second polarization diffraction grating layer disposed on the first polarization diffraction grating layer. The first polarization diffraction grating layer includes a molecular structure that is twisted according to a first twist sense such that respective relative alignments of molecules of the first polarization diffraction grating layer are rotated by a first twisted angle over a first thickness defined between opposing faces of the first polarization diffraction grating layer. The second polarization diffraction grating layer includes a molecular structure that is twisted according to a second twist sense opposite to the first twist sense such that respective relative alignments of molecules of the second polarization diffraction grating layer are rotated by a second twisted angle over a second thickness defined between opposing faces of the second polarization diffraction grating layer.

SUMMARY OF THE INVENTION

In a polarization diffraction element formed of a liquid crystal compound, a direction in which light is bent varies depending on polarized light. Specifically, left circularly polarized light and right circularly polarized light incident into the polarization diffraction element are bent in opposite directions and separated. Therefore, light cannot be diffracted in a predetermined direction irrespective of polarized light, and the efficiency of diffracted light diffracted in a desired direction with respect to unpolarized light is at most 50%.

An object of the present invention is to provide a transmissive liquid crystal diffraction element that can diffract different polarized light components in the same direction and can diffract unpolarized light with high efficiency.

In order to achieve the object, the present invention has the following configurations.

[1] A transmissive liquid crystal diffraction element comprising:
a first optically-anisotropic layer to a fourth optically-anisotropic layer each of which has a liquid crystal alignment pattern in which a direction of an optical axis derived from a liquid crystal compound changes while continuously rotating in at least one in-plane direction,
in which the optical axis derived from the liquid crystal compound in each of the first optically-anisotropic layer to the fourth optically-anisotropic layer is twisted in a thickness direction,
a rotation direction of the optical axis in the liquid crystal alignment pattern of the first optically-anisotropic layer and a rotation direction of the optical axis in the liquid crystal alignment pattern of the second optically-anisotropic layer are opposite to each other,
a rotation direction of the optical axis in the liquid crystal alignment pattern of the third optically-anisotropic layer and a rotation direction of the optical axis in the liquid crystal alignment pattern of the fourth optically-anisotropic layer are opposite to each other,
a twisted direction of the optical axis derived from the liquid crystal compound in the thickness direction of the first optically-anisotropic layer and a twisted direction of the optical axis derived from the liquid crystal compound in the thickness direction of the second optically-anisotropic layer are opposite to each other,
a twisted direction of the optical axis derived from the liquid crystal compound in the thickness direction of the third optically-anisotropic layer and a twisted direction of the optical axis derived from the liquid crystal compound in the thickness direction of the fourth optically-anisotropic layer are opposite to each other,
in a case where a length over which the direction of the optical axis derived from the liquid crystal compound in the liquid crystal alignment pattern rotates by 180° in a plane is set as a single period, a single period of the liquid crystal alignment pattern in the first optically-anisotropic layer and a single period of the liquid crystal alignment pattern in the second optically-anisotropic layer are the same,
a single period of the liquid crystal alignment pattern in the third optically-anisotropic layer and a single period of the liquid crystal alignment pattern in the fourth optically-anisotropic layer are the same, and
the single period of the liquid crystal alignment pattern in the first optically-anisotropic layer and the single period of the liquid crystal alignment pattern in the third optically-anisotropic layer are different.

[2] The transmissive liquid crystal diffraction element according to [1],
in which a twisted angle of the optical axis derived from the liquid crystal compound in the thickness direction of each of the first optically-anisotropic layer to the fourth optically-anisotropic layer is less than 360°.

[3] The transmissive liquid crystal diffraction element according to [1] or [2],
in which each of the first optically-anisotropic layer to the fourth optically-anisotropic layer has the liquid crystal alignment pattern in a radial shape.

[4] The transmissive liquid crystal diffraction element according to any one of [1] to [3],
in which in at least one combination among a combination of the first optically-anisotropic layer and the second optically-anisotropic layer and a combination of the third optically-anisotropic layer and the fourth optically-anisotropic layer, the single period of the liquid crystal alignment pattern gradually changes in one direction.

[5] The transmissive liquid crystal diffraction element according to [3] or [4],
in which a difference between a reciprocal of the single period of the liquid crystal alignment pattern in the first optically-anisotropic layer and a reciprocal of the single period of the liquid crystal alignment pattern in the third optically-anisotropic layer gradually increases from a center portion toward an outer side portion of the radial liquid crystal alignment pattern.

[6] The transmissive liquid crystal diffraction element according to any one of [1] to [5], further comprising:
a C-plate that is provided between any of the first optically-anisotropic layer to the fourth optically-anisotropic layer.

[7] The transmissive liquid crystal diffraction element according to any one of [1] to [6],
in which in at least one combination among a combination of the first optically-anisotropic layer and the second optically-anisotropic layer and a combination of the third optically-anisotropic layer and the fourth optically-anisotropic layer, the liquid crystal compound of one optically-anisotropic layer is a rod-like liquid crystal compound, and the liquid crystal compound of the other optically-anisotropic layer is a disk-like liquid crystal compound.

According to an aspect of the present invention, a transmissive liquid crystal diffraction element that can diffract different polarized light components in the same direction and also has high diffraction efficiency with respect to unpolarized light can be provided.

DESCRIPTION OF THE PREFERRED EMBODIMENTS

Figure 1:
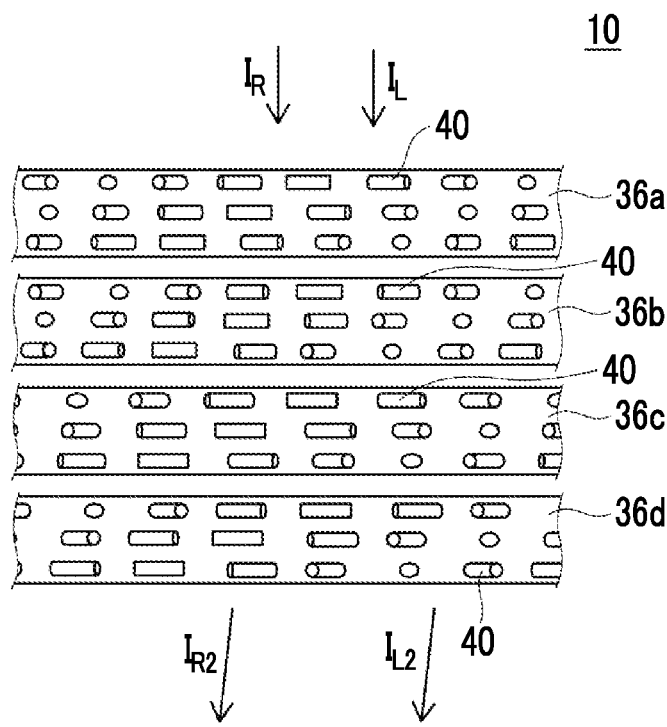
FIG. 1 is a diagram conceptually showing an example of a transmissive liquid crystal diffraction element according to the present invention.

Hereinafter, a transmissive liquid crystal diffraction element according to an embodiment of the present invention will be described in detail based on a preferred embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" and "equal" includes a case where an error range is generally allowable in the technical field.

Transmissive Liquid Crystal Diffraction Element

The transmissive liquid crystal diffraction element according to the embodiment of the present invention comprises:
a first optically-anisotropic layer to a fourth optically-anisotropic layer each of which has a liquid crystal alignment pattern in which a direction of an optical axis derived from a liquid crystal compound changes while continuously rotating in at least one in-plane direction,
in which the optical axis derived from the liquid crystal compound in each of the first optically-anisotropic layer to the fourth optically-anisotropic layer is twisted in a thickness direction,
a rotation direction of the optical axis in the liquid crystal alignment pattern of the first optically-anisotropic layer and a rotation direction of the optical axis in the liquid crystal alignment pattern of the second optically-anisotropic layer are opposite to each other,
a rotation direction of the optical axis in the liquid crystal alignment pattern of the third optically-anisotropic layer and a rotation direction of the optical axis in the liquid crystal alignment pattern of the fourth optically-anisotropic layer are opposite to each other,
a twisted direction of the optical axis derived from the liquid crystal compound in the thickness direction of the first optically-anisotropic layer and a twisted direction of the optical axis derived from the liquid crystal compound in the thickness direction of the second optically-anisotropic layer are opposite to each other, a twisted direction of the optical axis derived from the liquid crystal compound in the thickness direction of the third optically-anisotropic layer and a twisted direction of the optical axis derived from the liquid crystal compound in the thickness direction of the fourth optically-anisotropic layer are opposite to each other, in a case where a length over which the direction of the optical axis derived from the liquid crystal compound in the liquid crystal alignment pattern rotates by 180° in a plane is set as a single period, a single period of the liquid crystal alignment pattern in the first optically-anisotropic layer and a single period of the liquid crystal alignment pattern in the second optically-anisotropic layer are the same, a single period of the liquid crystal alignment pattern in the third optically-anisotropic layer and a single period of the liquid crystal alignment pattern in the fourth optically-anisotropic layer are the same, and a single period of the liquid crystal alignment pattern in the first optically-anisotropic layer and a single period of the liquid crystal alignment pattern in the third optically-anisotropic layer are different.

FIG. 1 conceptually shows an example of the transmissive liquid crystal diffraction element according to the embodiment of the present invention.

A transmissive liquid crystal diffraction element 10 shown in FIG. 1 includes a first optically-anisotropic layer 36a, a second optically-anisotropic layer 36b, a third optically-anisotropic layer 36c, and a fourth optically-anisotropic layer 36d that are disposed in this order in the thickness direction. In FIG. 1, in order to simplify the drawing to clearly show a configuration of the transmissive liquid crystal diffraction element 10, in the first optically-anisotropic layer 36a to the fourth optically-anisotropic layer 36d, only some liquid crystal compounds 40 (liquid crystal compound molecules) are conceptually shown. However, each of the first optically-anisotropic layer 36a to the fourth optically-anisotropic layer 36d has a structure in which the liquid crystal compounds 40 are laminated in the thickness direction as conceptually shown in FIG. 2 and where optical axes of the liquid crystal compounds 40 laminated in the thickness direction are aligned to be twisted.

Each of the first optically-anisotropic layer 36a to the fourth optically-anisotropic layer 36d has a liquid crystal alignment pattern in which a direction of an optical axis derived from the liquid crystal compound 40 changes while continuously rotating in at least one in-plane direction.

Each of the first optically-anisotropic layer 36a to the fourth optically-anisotropic layer 36d has the above-described liquid crystal alignment pattern such that transmitted light can be diffracted. In this case, in a case where a length over which the direction of the optical axis derived from the liquid crystal compound 40 in the liquid crystal alignment pattern rotates by 180° in a plane is set as a single period (hereinafter, also referred to as the single period of the liquid crystal alignment pattern), a diffraction angle of each of the optically-anisotropic layers depends on the length of the single period. Therefore, in each of the optically-anisotropic layers, the diffraction angle can be adjusted by adjusting the single period of the liquid crystal alignment pattern.

In addition, regarding the light diffraction of the optically-anisotropic layer having the liquid crystal alignment pattern, a direction in which the light is diffracted varies depending on polarized light. Specifically, left circularly polarized light and right circularly polarized light incident into the optically-anisotropic layer are diffracted and separated in opposite directions. The diffraction direction of the optically-anisotropic layer depends on the rotation direction of the optical axis in the liquid crystal alignment pattern.

In addition, the optical axis derived from the liquid crystal compound in each of the first optically-anisotropic layer 36a to the fourth optically-anisotropic layer 36d is twisted in the thickness direction. As described above, the optically-anisotropic layer having the liquid crystal alignment pattern diffracts light in the direction that varies depending on polarized light. In this case, in a case where the optical axis derived from the liquid crystal compound is twisted in the thickness direction, an equiphase surface is oblique to a main surface of the optically-anisotropic layer. Therefore, depending on an incidence angle of light, one polarized light is likely to be diffracted, and another polarized light is not likely to be diffracted. This point will be described below. The equiphase surface is a periodic surface in which the liquid crystal compound is directed in the same alignment direction.

In addition, in the present invention, a rotation direction of the optical axis in the liquid crystal alignment pattern of the first optically-anisotropic layer 36a and a rotation direction of the optical axis in the liquid crystal alignment pattern of the second optically-anisotropic layer 36b are opposite to each other. In addition, a single period of the liquid crystal alignment pattern in the first optically-anisotropic layer 36a and a single period of the liquid crystal alignment pattern in the second optically-anisotropic layer 36b are the same. In addition, a twisted direction of the optical axis derived from the liquid crystal compound in the thickness direction of the first optically-anisotropic layer 36a and a twisted direction of the optical axis derived from the liquid crystal compound in the thickness direction of the second optically-anisotropic layer 36b are opposite to each other.

In addition, a rotation direction of the optical axis in the liquid crystal alignment pattern of the third optically-anisotropic layer 36c and a rotation direction of the optical axis in the liquid crystal alignment pattern of the fourth optically-anisotropic layer 36d are opposite to each other. In addition, a single period of the liquid crystal alignment pattern in the third optically-anisotropic layer 36c and a single period of the liquid crystal alignment pattern in the fourth optically-anisotropic layer 36d are the same. In addition, a twisted direction of the optical axis derived from the liquid crystal compound in the thickness direction of the third optically-anisotropic layer 36c and a twisted direction of the optical axis derived from the liquid crystal compound in the thickness direction of the fourth optically-anisotropic layer 36d are opposite to each other.

Further, a single period of the liquid crystal alignment pattern in the first optically-anisotropic layer 36a (and the second optically-anisotropic layer 36b) and a single period of the liquid crystal alignment pattern in the third optically-anisotropic layer 36c (and the fourth optically-anisotropic layer 36d) are different.

In the example shown in FIG. 1, the rotation direction of the optical axis in the liquid crystal alignment pattern of the first optically-anisotropic layer 36a is right-rotating (clockwise) from the left toward the right in a view from the top in FIG. 1. On the other hand, the rotation direction of the optical axis in the liquid crystal alignment pattern of the second optically-anisotropic layer 36b is left-rotating (counterclockwise). In addition, the twisted direction of the optical axis derived from the liquid crystal compound in the thickness direction of the first optically-anisotropic layer 36a is right-twisted (clockwise) from the top to the bottom. On the other hand, the twisted direction of the optical axis derived from the liquid crystal compound in the thickness direction of the second optically-anisotropic layer 36b is left-twisted (counterclockwise).

In addition, in the example shown in FIG. 1, the rotation direction of the optical axis in the liquid crystal alignment pattern of the third optically-anisotropic layer 36c is right-rotating (clockwise) from the left toward the right in a view from the top in FIG. 1. On the other hand, the rotation direction of the optical axis in the liquid crystal alignment pattern of the fourth optically-anisotropic layer 36d is left-rotating (counterclockwise). In addition, the twisted direction of the optical axis derived from the liquid crystal compound in the thickness direction of the third optically-anisotropic layer 36c is right-twisted (clockwise) from the top to the bottom. On the other hand, the twisted direction of the optical axis derived from the liquid crystal compound in the thickness direction of the fourth optically-anisotropic layer 36d is left-twisted (counterclockwise).

In addition, as shown in FIG. 1, the single period of the liquid crystal alignment pattern in the first optically-anisotropic layer 36a and the single period of the liquid crystal alignment pattern in the second optically-anisotropic layer 36b are the same, the single period of the liquid crystal alignment pattern in the third optically-anisotropic layer 36c and the single period of the liquid crystal alignment pattern in the fourth optically-anisotropic layer 36d are the same, and the single period of the liquid crystal alignment pattern in the first optically-anisotropic layer 36a and the single period of the liquid crystal alignment pattern in the third optically-anisotropic layer 36c are different.

The transmissive liquid crystal diffraction element 10 according to the embodiment of the present invention having the above-described configuration diffracts incident light while allowing transmission of the light. In this case, right circularly polarized light and left circularly polarized light can be diffracted in the same direction. That is, the transmissive liquid crystal diffraction element 10 according to the embodiment of the present invention can realize a transmissive liquid crystal diffraction element that can diffract different polarized light components in the same direction and has high diffraction efficiency. This action will be described below in detail.

The rotation direction of the optical axis in the liquid crystal alignment pattern of each of the optically-anisotropic layers and the twisted direction of the optical axis in the thickness direction are not limited to the example shown in FIG. 1, and another combination may be adopted as long as the rotation directions of the optical axes in the liquid crystal alignment patterns are opposite to each other and the twisted directions of the optical axes in the thickness direction are opposite to each other in the first optically-anisotropic layer 36a and the second optically-anisotropic layer 36b, and the rotation directions of the optical axes in the liquid crystal alignment patterns are opposite to each other and the twisted directions of the optical axes in the thickness direction are opposite to each other in the third optically-anisotropic layer 36c and the fourth optically-anisotropic layer 36d.

In addition, in the example shown in FIG. 1, the rotation directions of the optical axes in the liquid crystal alignment patterns and the twisted directions of the optical axes in the thickness direction are the same in the first optically-anisotropic layer 36a and the third optically-anisotropic layer 36c, and the rotation directions of the optical axes in the liquid crystal alignment patterns and the twisted directions of the optical axes in the thickness direction are the same in the second optically-anisotropic layer 36b and the fourth optically-anisotropic layer 36d. However, the present invention is not limited to the example. For example, a configuration may be adopted in which the rotation directions of the optical axes in the liquid crystal alignment patterns are opposite to each other and the twisted directions of the optical axes in the thickness direction are the same in the first optically-anisotropic layer 36a and the fourth optically-anisotropic layer 36d, and the rotation directions of the optical axes in the liquid crystal alignment patterns are opposite to each other and the twisted directions of the optical axes in the thickness direction are the same in the second optically-anisotropic layer 36b and the third optically-anisotropic layer 36c.

In the present invention, it is preferable that the rotation directions of the optical axes in the liquid crystal alignment patterns and the twisted directions of the optical axes in the thickness direction are the same in one of the first optically-anisotropic layer 36a or the second optically-anisotropic layer 36b and one of the third optically-anisotropic layer 36c or the fourth optically-anisotropic layer 36d, and the rotation directions of the optical axes in the liquid crystal alignment patterns and the twisted directions of the optical axes in the thickness direction are the same in the other one of the first optically-anisotropic layer 36a or the second optically-anisotropic layer 36b and the other one of the third optically-anisotropic layer 36c or the fourth optically-anisotropic layer 36d.

In addition, it is preferable that average tilt directions (tilted to the right or tilted to the left) of the equiphase surfaces in the optically-anisotropic layers are the same. When the tilt directions of the equiphase surfaces of the optically-anisotropic layers are opposite to each other, the intensity (diffraction efficiency) of light to be diffracted decreases. In addition, the average tilt angle of the equiphase surface is preferably 5 degrees to 35 degrees with respect to the normal direction of the substrate surface as 0 degrees. Here, the average tilt angle refers to an average angle of tilt angles in the thickness direction in a case where the optically-anisotropic layer has a distribution of tilt angle in the thickness direction.

In addition, in the example shown in FIG. 1, the optically-anisotropic layers are disposed spaced from each other. However, the present invention is not limited thereto, and the optically-anisotropic layers may be disposed adjacent to each other. For example, the first optically-anisotropic layer 36a and the second optically-anisotropic layer 36b may be disposed adjacent to each other, the second optically-anisotropic layer 36b and the third optically-anisotropic layer 36c may be disposed spaced from each other, and the third optically-anisotropic layer 36c and the fourth optically-anisotropic layer 36d may be disposed adjacent to each other.

Optically-Anisotropic Layer

The first optically-anisotropic layer 36a to the fourth optically-anisotropic layer 36d will be described using FIGS. 2 and 3. The first optically-anisotropic layer 36a to the fourth optically-anisotropic layer 36d have the same configuration, except that the rotation directions of the optical axes in the liquid crystal alignment patterns, the single periods of the liquid crystal alignment patterns, and the twisted directions of the optical axes in the thickness direction are different. Therefore, in a case where the first optically-anisotropic layer 36a to the fourth optically-anisotropic layer 36d do not need to be distinguished from each other, the first optically-anisotropic layer 36a to the fourth optically-anisotropic layer 36d will be collectively referred to as the optically-anisotropic layer 36.

Figure 2:
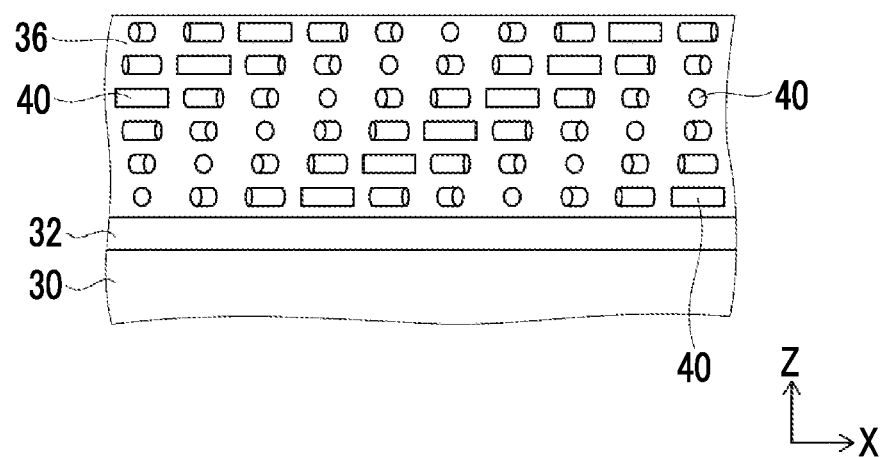
FIG. 2 is a diagram conceptually showing an optically-anisotropic layer in the transmissive liquid crystal diffraction element shown in FIG. 1.
Figure 3:
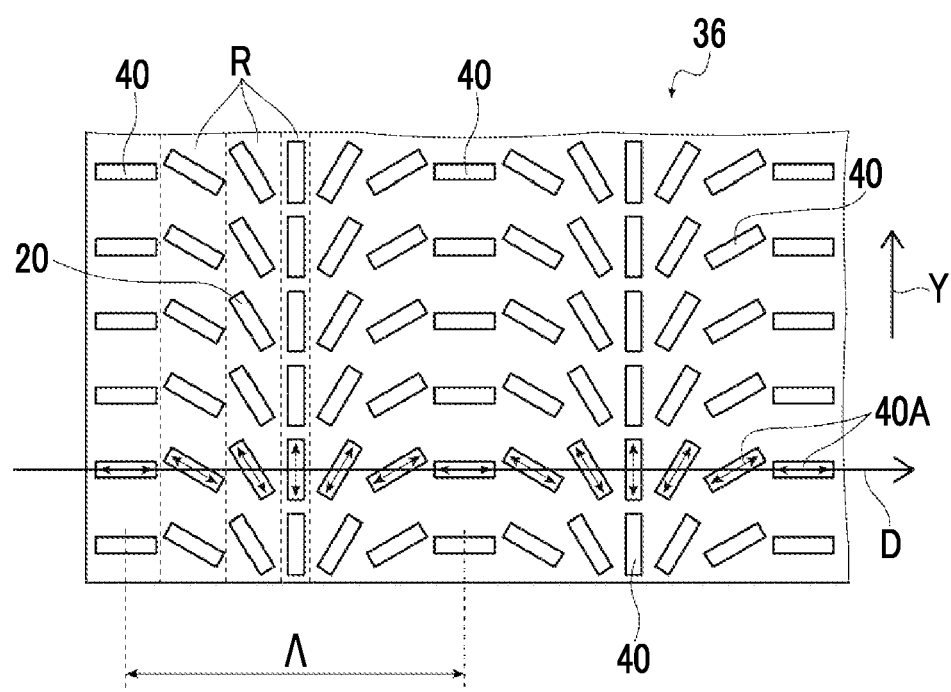
FIG. 3 is a plan view showing the optically-anisotropic layer shown in FIG. 2.

The example shown in FIGS. 2 and 3 is the optically-anisotropic layer 36 that is formed by immobilizing a liquid crystal phase where a liquid crystal compound is aligned, has a liquid crystal alignment pattern in which a direction of an optical axis derived from the liquid crystal compound changes while continuously rotating in at least one in-plane direction, and has a configuration in which the optical axis derived from the liquid crystal compound is twisted in the thickness direction. In the optically-anisotropic layer 36 in the example shown in FIGS. 2 and 3, the rotation direction of the optical axis in the liquid crystal alignment pattern and the twisted direction of the optical axis in the thickness direction are the same as those of the first optically-anisotropic layer 36a in FIG. 1.

In the example shown in FIG. 2, the optically-anisotropic layer 36 is laminated on an alignment film 32 that is laminated on a support 30.

In a case where the first optically-anisotropic layer 36a to the fourth optically-anisotropic layer 36d are used as the transmissive liquid crystal diffraction element, as in the example shown in FIG. 2, the optically-anisotropic layer 36 may be used in a state where it is laminated on the support 30 and the alignment film 32. Alternatively, the optically-anisotropic layer 36 may be used, for example, in a state where only the alignment film 32 and the optically-anisotropic layer 36 are laminated after peeling off the support 30. Alternatively, the optically-anisotropic layer 36 may be used, for example, in a state where only the optically-anisotropic layer 36 is present after peeling off the support 30 and the alignment film 32.

<Support>

The support 30 supports the alignment film 32 and the optically-anisotropic layer 36. As the support 30, various sheet-shaped materials (films or plate-shaped materials) can be used as long as they can support the alignment film 32 and the optically-anisotropic layer 36.

A transmittance of the support 30 with respect to light to be diffracted is preferably 50% or more, more preferably 70% or more, and still more preferably 85% or more.

The thickness of the support 30 is not particularly limited and may be appropriately set depending on the use of the transmissive liquid crystal diffraction element, a material for forming the support 30, and the like in a range where the alignment film 32 and the optically-anisotropic layer 36 can be supported.

The thickness of the support 30 is preferably 1 to 1000 µm, more preferably 3 to 250 µm, and still more preferably 5 to 150 µm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

<Alignment Film>

The alignment film 32 is formed on the surface of the support 30.

The alignment film 32 is an alignment film for aligning the liquid crystal compound 40 to the predetermined liquid crystal alignment pattern during the formation of the optically-anisotropic layer 36.

As described above, in the present invention, the optically-anisotropic layer 36 has a liquid crystal alignment pattern in which a direction of an optical axis 40A (refer to FIG. 3) derived from the liquid crystal compound 40 changes while continuously rotating in one in-plane direction. Accordingly, the alignment film 32 is formed such that the optically-anisotropic layer 36 can form the liquid crystal alignment pattern.

In the following description, "the direction of the optical axis 40A rotates" will also be simply referred to as "the optical axis 40A rotates".

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-H9-152509A), or an alignment film 32 such as JP2005-97377A, JP2005-99228A, and JP2005-128503A is preferable.

The alignment film 32 can be suitably used as a so-called photo-alignment film obtained by irradiating a photo-alignment material with polarized light or non-polarized light. That is, a photo-alignment film that is formed by applying a photo-alignment material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitably used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 μm and more preferably 0.05 to 2 μm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 4:
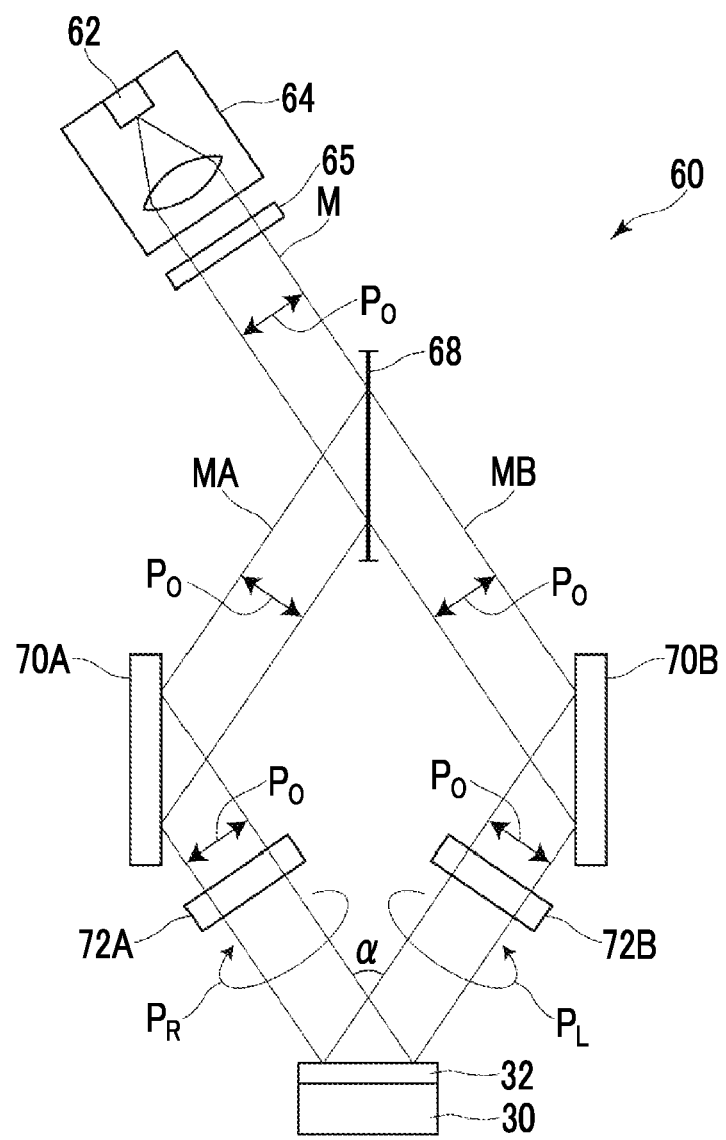
FIG. 4 is a conceptual diagram showing an example of an exposure device that exposes an alignment film for forming the optically-anisotropic layer shown in FIG. 2.

FIG. 4 conceptually shows an example of an exposure device that exposes the alignment film 32 to form an alignment pattern.

An exposure device 60 shown in FIG. 4 includes: a light source 64 including a laser 62; an λ/2 plate 65 that changes a polarization direction of laser light M emitted from the laser 62; a beam splitter 68 that splits the laser light M emitted from the laser 62 into two beams MA and MB; mirrors 70A and 70B that are disposed on optical paths of the split two beams MA and MB; and λ/4 plates 72A and 72B.

The light source 64 emits linearly polarized light $P_O$. The λ/4 plate 72A converts the linearly polarized light $P_O$ (beam MA) into right circularly polarized light $P_R$, and the λ/4 plate 72B converts the linearly polarized light $P_O$ (beam MB) into left circularly polarized light $P_L$.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarization state of light with which the alignment film 32 is irradiated periodically changes according to interference fringes. As a result, an alignment film (hereinafter, also referred to as "patterned alignment film") having an alignment pattern in which the alignment state changes periodically is obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the optically-anisotropic layer on the alignment film 32 having the alignment pattern in which the alignment state periodically changes, as described below, the optically-anisotropic layer 36 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has an alignment pattern to obtain the liquid crystal alignment pattern in which the liquid crystal compound is aligned such that the direction of the optical axis of the liquid crystal compound in the optically-anisotropic layer formed on the patterned alignment film changes while continuously rotating in at least one in-plane direction. In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the present invention, the alignment film 32 is provided as a preferable aspect and is not a configuration requirement.

For example, the following configuration can also be adopted, in which, by forming the alignment pattern on the support 30 using a method of rubbing the support 30, a method of processing the support 30 with laser light or the like, the optically-anisotropic layer has the liquid crystal alignment pattern in which the direction of the optical axis 40A derived from the liquid crystal compound 40 changes while continuously rotating in at least one in-plane direction. That is, in the present invention, the support 30 may be made to act as the alignment film.

<Optically-Anisotropic Layer>

The optically-anisotropic layer 36 is formed on a surface of the alignment film 32.

As described above, the optically-anisotropic layer 36 is formed by immobilizing a liquid crystal phase where a liquid crystal compound is aligned and has a liquid crystal alignment pattern in which a direction of an optical axis derived from the liquid crystal compound changes while continuously rotating in at least one in-plane direction.

In addition, as conceptually shown in FIG. 2, the optically-anisotropic layer 36 has a twisted structure in which the liquid crystal compound 40 is turned and laminated in the thickness direction. In the example shown in the drawing, a total twisted angle between the liquid crystal compound 40 present on one main surface side of the optically-anisotropic layer 36 and the liquid crystal compound 40 present on the other main surface side of the optically-anisotropic layer 36 is less than 360°.

This way, in a case where the optically-anisotropic layer 36 has the liquid crystal alignment pattern where the direction of the optical axis 40A changes while continuously rotating along the arrangement axis D in a plane and has the structure where liquid crystal compound 40 is twisted in the thickness direction, in a cross section parallel to the arrangement axis D, equiphase surfaces that connect the liquid crystal compounds 40 directed in the same direction in the thickness direction are tilted with respect to the main surface of the optically-anisotropic layer 36. By tilting the equiphase surface, depending on the angle of incident light, the turning direction of circularly polarized light, and the like, the diffraction efficiency decreases, and there is a case where the action of diffraction does not substantially occur. For example, in the optically-anisotropic layer 36 shown in FIG. 2, right circularly polarized light that is vertically incident into the main surface is diffracted to travel in the lower left direction. On the other hand, left circularly polarized light that is vertically incident into the main surface is diffracted to travel in the lower right direction in FIG. 2 due to the action of the liquid crystal alignment pattern. In this case, since the equiphase surface is tilted in the opposite direction, the diffraction action does not work sufficiently, and the incident light transmits as zero-order light without being diffracted.

In a case where the cross section parallel to the arrangement axis D is observed with a SEM (scanning electron microscope), a stripe pattern where a bright portion and a dark portion derived from the direction of the liquid crystal compound are alternately arranged is observed. The tilt of the bright portion and the dark portion can be considered as the tilt of the equiphase surface.

By using this case where zero-order light transmits through each of the first optically-anisotropic layer 36a to the fourth optically-anisotropic layer 36d, the transmissive liquid crystal diffraction element according to the embodiment of the present invention is configured to diffract right circularly polarized light and left circularly polarized light in the same direction as the transmissive liquid crystal diffraction element. This point will be described below.

<<Method of Forming Optically-Anisotropic Layer>>

The optically-anisotropic layer has a liquid crystal alignment pattern in which a direction of an optical axis derived from the liquid crystal compound changes while continuously rotating in at least one in-plane direction, and can be formed by immobilizing a liquid crystal phase, in a layer shape, that is aligned to the twisted structure where the liquid crystal compound (optical axis) is turned and laminated in the thickness direction.

The structure in which a liquid crystal phase is immobilized may be a structure in which the alignment of the liquid crystal compound as a liquid crystal phase is immobilized. Typically, the structure in which a liquid crystal phase is immobilized is preferably a structure which is obtained by aligning the polymerizable liquid crystal compound in the liquid crystal alignment pattern, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 40 in the optically-anisotropic layer does not necessarily exhibit liquid crystallinity. For example, the molecular weight of the polymerizable liquid crystal compound may be increased by a curing reaction such that the liquid crystallinity thereof is lost.

Examples of a material used for forming the optically-anisotropic layer obtained by immobilizing a liquid crystal phase include a liquid crystal composition including a liquid crystal compound. It is preferable that the liquid crystal compound is a polymerizable liquid crystal compound.

In addition, in order for the optically-anisotropic layer to have the configuration where the liquid crystal compound is twisted and aligned in the thickness direction, the liquid crystal composition may include a chiral agent.

In addition, the liquid crystal composition used for forming the optically-anisotropic layer may further include a surfactant and a polymerization initiator.

—Polymerizable Liquid Crystal Compound—

The polymerizable liquid crystal compound may be a rod-like liquid crystal compound or a disk-like liquid crystal compound.

Examples of the rod-like polymerizable liquid crystal compound for forming an optically-anisotropic layer include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586, WO95/24455, WO97/00600, WO98/23580, WO98/52905, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Like Liquid Crystal Compound—

As the disk-like liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

—Chiral Agent (Optically Active Compound)—

The chiral agent has a function of inducing a twisted structure of a liquid crystal phase. The chiral agent may be selected depending on the purposes because a helical twisted direction and a helical twisting power (HTP) to be induced vary depending on compounds.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes a chiral carbon atom. However, an axially chiral compound or a planar chiral compound not having a chiral carbon atom can also be used as the chiral agent. Examples of the axially chiral compound or the planar chiral compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a desired twisted alignment corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01 to 200 mol % and more preferably 1 to 30 mol % with respect to the content molar amount of the liquid crystal compound.

—Surfactant—

The liquid crystal composition used for forming the optically-anisotropic layer may include a surfactant.

It is preferable that the surfactant is a compound that can function as an alignment control agent contributing to the stable or rapid alignment of the liquid crystal compound. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and "0082" to "0085" of JP2002-129162A, and fluorine (meth)acrylate polymers described in paragraphs "0018" to "0043" of JP2007-272185A.

The surfactants may be used alone or in combination of two or more kinds.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator to be used is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris [3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. The crosslinking agents may be used alone or in combination of two or more kinds.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

—Other Additives—

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

It is preferable that the liquid crystal composition is used as a liquid during the formation of the optically-anisotropic layer.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. The organic solvents may be used alone or in combination of two or more kinds. Among these, a ketone is preferable in consideration of an environmental burden.

In a case where the optically-anisotropic layer is formed, it is preferable that the optically-anisotropic layer is formed by applying the liquid crystal composition to a surface where the optically-anisotropic layer is to be formed, aligning the liquid crystal compound to a state the liquid crystal phase aligned in the predetermined liquid crystal alignment pattern, and curing the liquid crystal compound.

That is, in a case where the optically-anisotropic layer is formed on the alignment film 32, it is preferable that the optically-anisotropic layer obtained by immobilizing a liquid crystal phase is formed by applying the liquid crystal composition to the alignment film 32, aligning the liquid crystal compound in the predetermined liquid crystal alignment pattern, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the optically-anisotropic layer. In the drying and/or heating step, the liquid crystal compound in the liquid crystal composition only has to be aligned in the predetermined liquid crystal alignment pattern and the twisted structure. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the optically-anisotropic layer is not particularly limited, and the thickness with which a required light reflectivity can be obtained may be appropriately set depending on the use of the optically-anisotropic layer, the light reflectivity required for the optically-anisotropic layer, the material for forming the optically-anisotropic layer, and the like.

<<Liquid Crystal Alignment Pattern of Optically-Anisotropic Layer>>

As described above, the optically-anisotropic layer has the liquid crystal alignment pattern in which the direction of the optical axis 40A derived from the liquid crystal compound 40 changes while continuously rotating in the one in-plane direction in the optically-anisotropic layer.

The optical axis 40A derived from the liquid crystal compound 40 is an axis having the highest refractive index in the liquid crystal compound 40, that is, a so-called slow axis. For example, in a case where the liquid crystal compound 40 is a rod-like liquid crystal compound, the optical axis 40A is parallel to a rod-like major axis direction. In the following description, the optical axis 40A derived from the liquid crystal compound 40 will also be referred to as "the optical axis 40A of the liquid crystal compound 40" or "the optical axis 40A".

FIG. 3 conceptually shows a plan view of the optically-anisotropic layer 36.

The plan view is a view in a case where the optically-anisotropic layer 36 is seen from the top in FIG. 2, that is, a view in a case where the optically-anisotropic layer 36 is seen from a thickness direction (laminating direction of the respective layers (films)).

In addition, in FIG. 3, in order to clarify the configuration of the optically-anisotropic layer 36, only the liquid crystal compound 40 on the surface of the alignment film 32 is shown.

As shown in FIG. 3, on the surface of the alignment film 32, the liquid crystal compound 40 forming the optically-anisotropic layer 36 has the liquid crystal alignment pattern in which the direction of the optical axis 40A changes while continuously rotating in the predetermined one in-plane direction indicated by arrow D (hereinafter, referred to as the arrangement axis D) in the optically-anisotropic layer according to the alignment pattern formed on the alignment film 32 as the lower layer. In the example shown in the drawing, the liquid crystal compound 40 has the liquid crystal alignment pattern in which the optical axis 40A of the liquid crystal compound 40 changes while continuously rotating clockwise in the arrangement axis D direction.

The liquid crystal compound 40 forming the optically-anisotropic layer 36 is two-dimensionally arranged in a direction orthogonal to the arrangement axis D and the one in-plane direction (arrangement axis D direction).

In the following description, the direction orthogonal to the arrangement axis D direction will be referred to as "Y direction" for convenience of description. That is, the arrow Y direction is a direction orthogonal to the one in-plane direction in which the direction of the optical axis 40A of the liquid crystal compound 40 changes while continuously rotating in the optically-anisotropic layer. Accordingly, in FIGS. 1 and 2 and FIGS. 5 and 6 described below, the Y direction is a direction orthogonal to the paper plane.

Specifically, "the direction of the optical axis 40A of the liquid crystal compound 40 changes while continuously rotating in the arrangement axis D direction (the predetermined one in-plane direction)" represents that an angle between the optical axis 40A of the liquid crystal compound 40, which is arranged in the arrangement axis D direction, and the arrangement axis D direction varies depending on positions in the arrangement axis D direction, and the angle between the optical axis 40A and the arrangement axis D direction sequentially changes from θ to θ+180° or θ−180° in the arrangement axis D direction.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present invention, the liquid crystal compound rotates in the direction in which an angle between the optical axes 40A of the liquid crystal compounds 40 adjacent to each other in the arrangement axis D direction decreases. Accordingly, in the optically-anisotropic layer shown in FIGS. 2 and 3, the optical axis 40A of the liquid crystal compound 40 rotates to the right (clockwise) in the direction indicated by the arrow of the arrangement axis D.

On the other hand, in the liquid crystal compound 40 forming the optically-anisotropic layer 36, the directions of the optical axes 40A are the same in the Y direction orthogonal to the arrangement axis D direction, that is, the Y direction orthogonal to the one in-plane direction in which the optical axis 40A continuously rotates.

In other words, in the liquid crystal compound 40 forming the optically-anisotropic layer 36, angles between the optical axes 40A of the liquid crystal compound 40 and the arrangement axis D direction are the same in the Y direction.

In the liquid crystal compounds arranged in the Y direction in the optically-anisotropic layer 36, the angles between the optical axes 40A and the arrangement axis D direction (the one in-plane direction in which the direction of the optical axis of the liquid crystal compound 40 rotates) are the same. Regions where the liquid crystal compounds 40 in which the angles between the optical axes 40A and the arrangement axis D direction are the same are disposed in the Y direction will be referred to as "regions R".

In this case, it is preferable that an in-plane retardation (Re) value of each of the regions R is a half wavelength, that is, $\lambda/2$. The in-plane retardation is calculated from the product of a difference $\Delta n$ in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction orthogonal to the direction of the slow axis. That is, the difference $\Delta n$ in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference $\Delta n$ in refractive index is the same as the difference in refractive index of the liquid crystal compound 40.

In the optically-anisotropic layer 36, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length $\Lambda$ of the single period in the liquid crystal alignment pattern.

That is, a distance between centers of two liquid crystal compounds 40 in the arrangement axis D direction is the length $\Lambda$ of the single period, the two liquid crystal compounds having the same angle in the arrangement axis D direction. Specifically, as shown in FIG. 3, a distance between centers in the arrangement axis D direction of two liquid crystal compounds 40 in which the arrangement axis D direction and the direction of the optical axis 40A match with each other is the length $\Lambda$ of the single period. In the following description, the length $\Lambda$ of the single period will also be referred to as "single period $\Lambda$".

In the liquid crystal alignment pattern of the optically-anisotropic layer 36, the single period $\Lambda$ is repeated in the arrangement axis D direction, that is, in the one in-plane direction in which the direction of the optical axis 40A changes while continuously rotating.

In a case where circularly polarized light is incident into the above-described optically-anisotropic layer 36, the light is refracted such that the direction of the circularly polarized light is converted.

Figure 5:
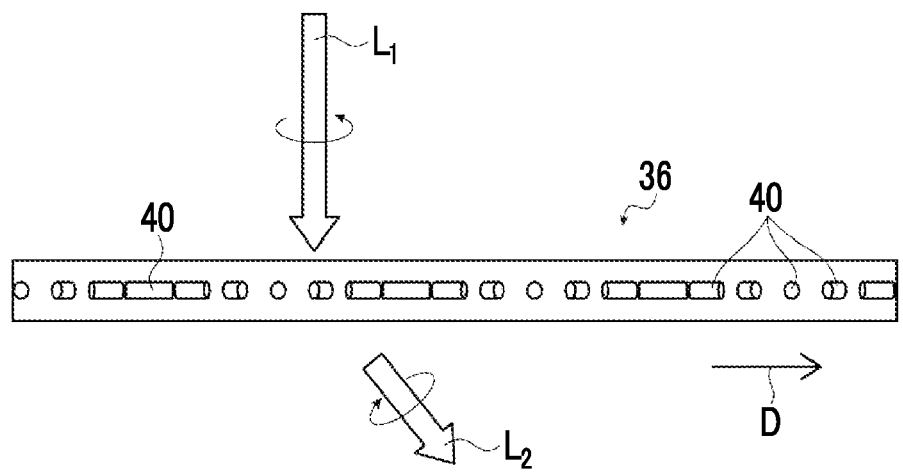
FIG. 5 is a conceptual diagram showing an action of the optically-anisotropic layer.
Figure 6:
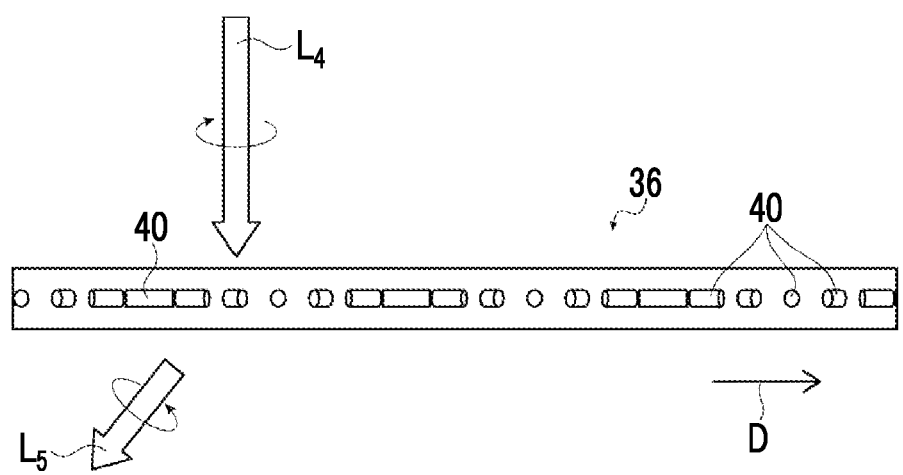
FIG. 6 is a conceptual diagram showing the action of the optically-anisotropic layer.

This action is conceptually shown in FIGS. 5 and 6. In the optically-anisotropic layer 36, the value of the product of the difference in refractive index of the liquid crystal compound and the thickness of the optically-anisotropic layer is $\lambda/2$. In addition, the description using FIGS. 5 and 6 is for describing the action of the liquid crystal alignment pattern of the optically-anisotropic layer 36, and the description will be made assuming that the optically-anisotropic layer 36 does not have the twisted structure of the optical axis in the thickness direction.

As shown in FIG. 5, in a case where the value of the product of the difference in refractive index of the liquid crystal compound and the thickness of the optically-anisotropic layer in the optically-anisotropic layer 36 is $\lambda/2$ and incidence light $L_1$ as left circularly polarized light is incident into the optically-anisotropic layer 36, the incidence light $L_1$ transmits through the optically-anisotropic layer 36 to be imparted with a retardation of 180°, and the transmitted light $L_2$ is converted into right circularly polarized light.

In addition, the liquid crystal alignment pattern formed in the optically-anisotropic layer 36 is a pattern that is periodic in the arrangement axis D direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrangement axis D direction with respect to an incidence direction. In the example shown in FIG. 5, the transmitted light $L_2$ is diffracted to travel in the lower right direction.

On the other hand, as shown in FIG. 6, in a case where the value of the product of the difference in refractive index of the liquid crystal compound and the thickness of the optically-anisotropic layer in the optically-anisotropic layer 36 is $\lambda/2$ and incidence light $L_4$ as right circularly polarized light is incident into the optically-anisotropic layer 36, the incidence light $L_4$ transmits through the optically-anisotropic layer 36 to be imparted with a retardation of 180° and is converted into transmitted light $L_5$ of left circularly polarized light.

In addition, the liquid crystal alignment pattern formed in the optically-anisotropic layer 36 is a pattern that is periodic in the arrangement axis D direction. Therefore, the transmitted light $L_5$ travels in a direction different from a traveling direction of the incidence light $L_4$. In this case, the transmitted Light $L_5$ travels in a direction different from the transmitted light $L_2$, that is, in a direction opposite to the arrow direction of the arrangement axis D with respect to the incidence direction. This way, the incidence light $L_4$ is converted into the transmitted light $L_5$ of left circularly polarized light that is tilted by a predetermined angle in a direction opposite to the arrangement axis D direction with respect to an incidence direction. In the example shown in FIG. 6, the transmitted light $L_5$ is diffracted to travel in the lower left direction.

Here, refraction angles of the transmitted light components $L_2$ and $L_5$ can be adjusted depending on the length of the single period $\Lambda$ of the liquid crystal alignment pattern formed in the optically-anisotropic layer 36. Specifically, even in the optically-anisotropic layer 36, as the single period $\Lambda$ of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, by reversing the rotation direction of the optical axis 40A of the liquid crystal compound 40 that rotates in the arrangement axis D direction, the refraction direction of transmitted light can be reversed. That is, in the example FIGS. 5 and 6, the rotation direction of the optical axis 40A toward the arrangement axis D direction is clockwise. By setting this rotation direction to be counterclockwise, the refraction direction of transmitted light can be reversed. Specifically, in FIGS. 5 and 6, in a case where the rotation direction of the optical axis 40A toward the arrangement axis D direction is counterclockwise, left circularly polarized light incident into the optically-anisotropic layer 36 from the upper side in the drawing transmits through the optically-anisotropic layer 36 such that the transmitted light is converted into right circularly polarized light and is diffracted to travel in the lower left direction in the drawing. In addition, right circularly polarized light incident into the optically-anisotropic layer 36 from the upper side in the drawing transmits through the optically-anisotropic layer 36 such that the transmitted light is converted into left circularly polarized light and is diffracted to travel in the lower right direction in the drawing.

(Action of Transmissive Liquid Crystal Diffraction Element)

Next, an action of the transmissive liquid crystal diffraction element according to the embodiment of the present invention having a configuration in which four optically-anisotropic layers having the liquid crystal alignment pattern are laminated will be described using FIG. 7.

As described above, in the transmissive liquid crystal diffraction element 10 according to the embodiment of the present invention, the first optically-anisotropic layer 36a to the fourth optically-anisotropic layer 36d having the liquid crystal alignment pattern are arranged in this order, the rotation directions of the optical axes in the liquid crystal alignment patterns are opposite to each other and the twisted directions of the optical axes in the thickness direction are opposite to each other in the first optically-anisotropic layer 36a and the second optically-anisotropic layer 36b, and the rotation directions of the optical axes in the liquid crystal alignment patterns are opposite to each other and the twisted directions of the optical axes in the thickness direction are opposite to each other in the third optically-anisotropic layer 36c and the fourth optically-anisotropic layer 36d. Further, the single periods of the liquid crystal alignment patterns of the first optically-anisotropic layer 36a and the second optically-anisotropic layer 36b are the same, the single periods of the liquid crystal alignment patterns of the third optically-anisotropic layer 36c and the fourth optically-anisotropic layer 36d are the same, and the single periods of the liquid crystal alignment patterns of the first optically-anisotropic layer 36a and the third optically-anisotropic layer 36c are the same.

Further, the single periods of the liquid crystal alignment patterns of the first optically-anisotropic layer 36a and the second optically-anisotropic layer 36b being the same represents that, as long as the single period of the liquid crystal alignment pattern of the second optically-anisotropic layer 36b has a difference of about 0.8 to 1.2 with respect to the single period of the liquid crystal alignment pattern of the first optically-anisotropic layer 36a, there is a small effect on the effect of the diffraction angle of light emitted from the second optically-anisotropic layer 36b.

Likewise, the single periods of the liquid crystal alignment patterns of the third optically-anisotropic layer 36c and the fourth optically-anisotropic layer 36d being the same represents that, as long as the single period of the liquid crystal alignment pattern of the third optically-anisotropic layer 36c has a difference of about 0.8 to 1.2 with respect to the single period of the liquid crystal alignment pattern of the fourth optically-anisotropic layer 36d, there is a small effect on the effect of the diffraction angle of light emitted from the fourth optically-anisotropic layer 36d.

Further, even in a case where there is a difference between the single periods of the liquid crystal alignment patterns of the first optically-anisotropic layer 36a and the second optically-anisotropic layer 36b, the difference between the single periods of the liquid crystal alignment patterns of the third optically-anisotropic layer 36c and the fourth optically-anisotropic layer 36d is canceled out by the difference between the single periods of the liquid crystal alignment patterns of the first optically-anisotropic layer 36a and the second optically-anisotropic layer 36b such that the diffraction angle of right circularly polarized light and left circularly polarized light emitted from the fourth optically-anisotropic layer 36d is an appropriate angle.

In addition, the direction of the arrangement axis D in the liquid crystal alignment pattern of the first optically-anisotropic layer 36a and the direction of the arrangement axis D in the liquid crystal alignment pattern of the second optically-anisotropic layer 36b match with each other. Likewise, the direction of the arrangement axis D in the liquid crystal alignment pattern of the third optically-anisotropic layer 36c and the direction of the arrangement axis D in the liquid crystal alignment pattern of the fourth optically-anisotropic layer 36d match with each other. Further, the direction of the arrangement axis D in the liquid crystal alignment pattern of the first optically-anisotropic layer 36a and the direction of the arrangement axis D in the liquid crystal alignment pattern of the third optically-anisotropic layer 36c match with each other. In the example shown in FIG. 7, in all of the optically-anisotropic layers, the direction of the arrangement axis D is the left direction in the drawing.

A case where right circularly polarized light $I_R$ and left circularly polarized light $I_L$ are incident into the transmissive liquid crystal diffraction element 10 having the above-described configuration from the first optically-anisotropic layer 36a side will be described as an example.

Figure 7:
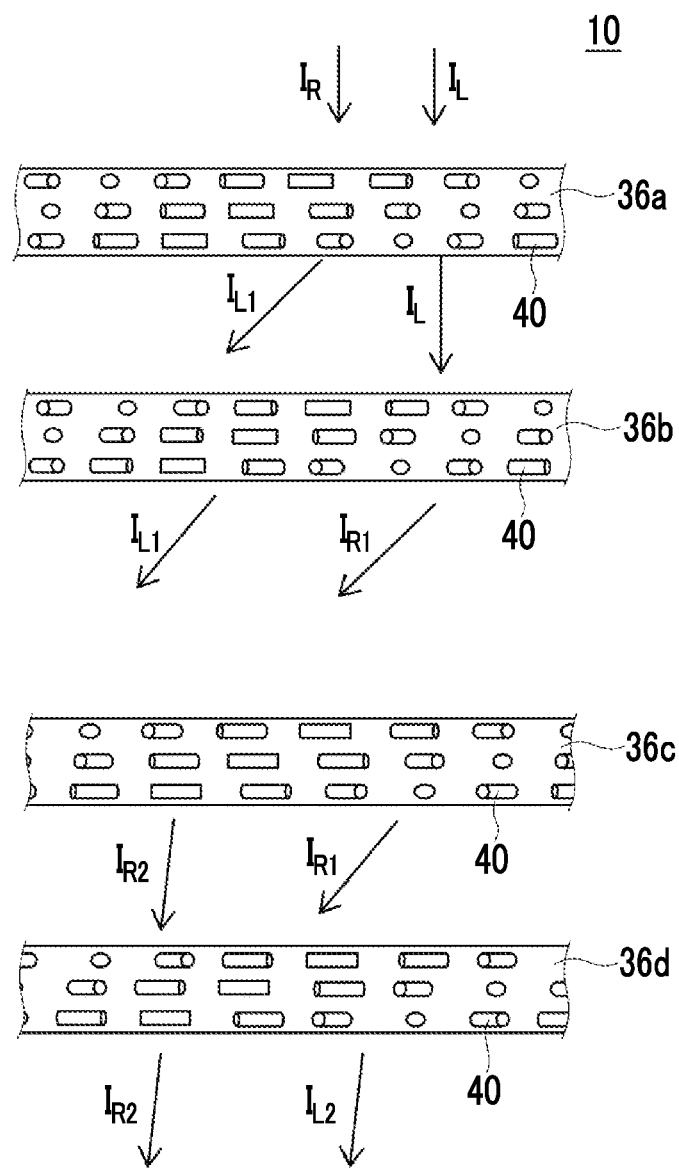
FIG. 7 is a conceptual diagram showing an action of the transmissive liquid crystal diffraction element shown in FIG. 1.

For example, as shown in FIG. 7, the right circularly polarized light $I_R$ and the left circularly polarized light $I_L$ are vertically incident into the main surface of the first optically-anisotropic layer 36a.

As described above, the optically-anisotropic layer diffracts the right circularly polarized light $I_R$ and the left circularly polarized light $I_L$ along the arrangement axis D in opposite directions. In the example shown in FIG. 7, the first optically-anisotropic layer 36a diffracts the incident right circularly polarized light $I_R$ in a direction in which the light travels along the arrangement axis D in the left direction in FIG. 7 with respect to the traveling direction of the incident right circularly polarized light $I_R$. In addition, as described above, the diffracted light is converted into left circularly polarized light $I_{L1}$.

On the other hand, the first optically-anisotropic layer 36a diffracts the incident left circularly polarized light $I_L$ along the arrangement axis D in the right direction in FIG. 7 with respect to the traveling direction of the incident left circularly polarized light $I_L$. However, as described above, the optically-anisotropic layer has the twisted structure, and the equiphase surface is tilted with respect to the main surface of the optically-anisotropic layer. Therefore, the action of diffraction in this direction does not work, and the incident left circularly polarized light $I_L$ (zero-order light) transmits through the first optically-anisotropic layer 36a as it is in the lower direction in FIG. 7 substantially without being diffracted.

The left circularly polarized light $I_{L1}$ and the left circularly polarized light $I_L$ transmitted through the first optically-anisotropic layer 36a are incident into the second optically-anisotropic layer 36b. As described above, in the second optically-anisotropic layer 36b, the rotation direction of the optical axis in the liquid crystal alignment pattern is opposite to that of the first optically-anisotropic layer 36a. Therefore, the second optically-anisotropic layer 36b diffracts the incident circularly polarized light in a direction opposite to that of the first optically-anisotropic layer 36a. That is, the left circularly polarized light is diffracted along the arrangement axis D in the left direction.

As shown in FIG. 7, the left circularly polarized light $I_{L1}$ is incident from the upper right direction to the lower left direction with respect to the second optically-anisotropic layer 36b. Here, the second optically-anisotropic layer 36b diffracts the incident left circularly polarized light $I_{L1}$ along the arrangement axis D in the left direction in FIG. 7 with respect to the traveling direction of the incident left circularly polarized light $I_{L1}$. However, the light is incident obliquely in the lower left direction with respect to the optically-anisotropic layer. Therefore, the light cannot be bent in the left direction, and the incident left circularly polarized light $I_{L1}$ (zero-order light) transmits through the second optically-anisotropic layer 36b as it is in the lower left direction substantially without being diffracted.

On the other hand, the second optically-anisotropic layer 36b diffracts the left circularly polarized light $I_L$ that is vertically incident into the main surface in a direction in which the light travels along the arrangement axis D in the left direction in FIG. 7 with respect to the traveling direction of the incident left circularly polarized light $I_L$. In addition, as described above, the diffracted light is converted into right circularly polarized light $I_{R1}$.

The single periods of the liquid crystal alignment patterns of the first optically-anisotropic layer 36a and the second optically-anisotropic layer 36b are the same. Therefore, the diffraction angle of the left circularly polarized light $I_{L1}$ in the first optically-anisotropic layer 36a and the diffraction angle of the right circularly polarized light $I_{R1}$ in the second optically-anisotropic layer 36b are substantially the same. Accordingly, the right circularly polarized light $I_{R1}$ and the left circularly polarized light $I_{L1}$ transmitted through the first optically-anisotropic layer 36a and the second optically-anisotropic layer 36b travel in the same direction (substantially parallel).

The right circularly polarized light $I_{R1}$ and the left circularly polarized light $I_{L1}$ transmitted through the second optically-anisotropic layer 36b are incident into the third optically-anisotropic layer 36c. In this case, the right circularly polarized light $I_{R1}$ and the left circularly polarized light $I_{L1}$ are diffracted by the first optically-anisotropic layer 36a and the second optically-anisotropic layer 36b. Therefore, the right circularly polarized light $I_{R1}$ and the left circularly polarized light $I_{L1}$ are incident into the third optically-anisotropic layer 36c from an oblique direction with respect to the main surface of the third optically-anisotropic layer 36c.

On the other hand, the third optically-anisotropic layer 36c diffracts the incident left circularly polarized light $I_{L1}$ along the arrangement axis D in the right direction in FIG. 7 with respect to the traveling direction of the incident left circularly polarized light $I_{L1}$. In addition, as described above, the diffracted light is converted into right circularly polarized light $I_{R2}$.

The left circularly polarized light $I_{L1}$ incident into the third optically-anisotropic layer 36c is diffracted in the left direction in FIG. 7 by the first optically-anisotropic layer 36a, and the third optically-anisotropic layer 36c diffracts the left circularly polarized light $I_{L1}$ in a direction (right direction) opposite to that of the first optically-anisotropic layer 36a. Accordingly, the diffraction angle of the right circularly polarized light $I_{R2}$ transmitted through the first optically-anisotropic layer 36a to the third optically-anisotropic layer 36c with respect to the right circularly polarized light $I_R$ incident into the transmissive liquid crystal diffraction element 10 is a difference between the diffraction angle of the first optically-anisotropic layer 36a and the diffraction angle of the third optically-anisotropic layer 36c.

Here, the single period of the liquid crystal alignment pattern of the third optically-anisotropic layer 36c is different from the single period of the liquid crystal alignment pattern of the first optically-anisotropic layer 36a. Therefore, the diffraction angle of the first optically-anisotropic layer 36a is different from the diffraction angle of the third optically-anisotropic layer 36c. In the example shown in FIG. 7, the single period of the liquid crystal alignment pattern of the third optically-anisotropic layer 36c is more than the single period of the liquid crystal alignment pattern of the first optically-anisotropic layer 36a. Therefore, the diffraction angle of the third optically-anisotropic layer 36c is less than the diffraction angle of the first optically-anisotropic layer 36a. Accordingly, the right circularly polarized light $I_{R2}$ transmitted through the first optically-anisotropic layer 36a to the third optically-anisotropic layer 36c travels in the lower left direction in a state where the light is substantially perpendicular to the main surface in FIG. 7.

On the other hand, the third optically-anisotropic layer 36c diffracts the incident right circularly polarized light $I_{R1}$ along the arrangement axis D in the left direction in FIG. 7 with respect to the traveling direction of the incident right circularly polarized light $I_{R1}$. However, as described above, the optically-anisotropic layer has the twisted structure, and the equiphase surface is tilted with respect to the main surface of the optically-anisotropic layer. Therefore, the action of diffraction in this direction does not work, and the incident right circularly polarized light $I_{R1}$ (zero-order light) transmits through the third optically-anisotropic layer 36c as it is in the lower left direction in FIG. 7 substantially without being diffracted.

The right circularly polarized light $I_{R2}$ and the right circularly polarized light $I_{R1}$ transmitted through the third optically-anisotropic layer 36c are incident into the fourth optically-anisotropic layer 36d. As described above, in the fourth optically-anisotropic layer 36d, the rotation direction of the optical axis in the liquid crystal alignment pattern is opposite to that of the third optically-anisotropic layer 36c. Therefore, the fourth optically-anisotropic layer 36d diffracts the incident circularly polarized light in a direction opposite to that of the third optically-anisotropic layer 36c. That is, the right circularly polarized light is diffracted along the arrangement axis D in the right direction.

As shown in FIG. 7, the right circularly polarized light $I_{R2}$ is incident into the fourth optically-anisotropic layer 36d to travel from the upper right direction to the lower left direction at an angle substantially perpendicular to the main surface of the fourth optically-anisotropic layer 36d. On the other hand, the fourth optically-anisotropic layer 36d diffracts the incident right circularly polarized light $I_{R2}$ along the arrangement axis D in the right direction in FIG. 7 with respect to the traveling direction of the incident right circularly polarized light $I_{R2}$. However, the equiphase surface is tilted with respect to the main surface of the optically-anisotropic layer. Therefore, the action of diffraction in this direction does not work, and the incident right circularly polarized light $I_{R2}$ (zero-order light) transmits through the fourth optically-anisotropic layer 36*d* as it is from the upper right direction to the lower left direction at an angle substantially perpendicular to the main surface in FIG. 7 substantially without being diffracted.

On the other hand, the fourth optically-anisotropic layer 36*d* diffracts the right circularly polarized light $I_{R1}$ that is incident in the largely tilted state from the upper right direction to the lower left direction in a direction in which the light travels along the arrangement axis D in the right direction in FIG. 7 with respect to the traveling direction of the incident right circularly polarized light $I_{R1}$. In addition, as described above, the diffracted light is converted into left circularly polarized light 112.

The right circularly polarized light $I_{R1}$ incident into the fourth optically-anisotropic layer 36*d* is diffracted in the left direction in FIG. 7 by the second optically-anisotropic layer 36*b*, and the fourth optically-anisotropic layer 36*d* diffracts the right circularly polarized light $I_{R1}$ in a direction (right direction) opposite to that of the second optically-anisotropic layer 36*b*. Accordingly, the diffraction angle of the left circularly polarized light $I_{L2}$ transmitted through the first optically-anisotropic layer 36*a* to the fourth optically-anisotropic layer 36*d* with respect to the left circularly polarized light $I_L$ incident into the transmissive liquid crystal diffraction element 10 is a difference between the diffraction angle of the second optically-anisotropic layer 36*b* and the diffraction angle of the fourth optically-anisotropic layer 36*d*.

The single period of the liquid crystal alignment pattern in the fourth optically-anisotropic layer 36*d* and the single period of the liquid crystal alignment pattern in the second optically-anisotropic layer 36*b* are different. Therefore, the diffraction angle of the second optically-anisotropic layer 36*b* is different from the diffraction angle of the fourth optically-anisotropic layer 36*d*. In the example shown in FIG. 7, the single period of the liquid crystal alignment pattern of the fourth optically-anisotropic layer 36*d* is more than the single period of the liquid crystal alignment pattern of the second optically-anisotropic layer 36*b*. Therefore, the diffraction angle of the fourth optically-anisotropic layer 36*d* is less than the diffraction angle of the second optically-anisotropic layer 36*b*. Accordingly, the left circularly polarized light $I_{L2}$ transmitted through the first optically-anisotropic layer 36*a* to the fourth optically-anisotropic layer 36*d* travels in the lower left direction in a state where the light is substantially perpendicular to the main surface in FIG. 7.

In addition, the single periods of the liquid crystal alignment patterns of the first optically-anisotropic layer 36*a* and the second optically-anisotropic layer 36*b* are the same, and the single periods of the liquid crystal alignment patterns of the third optically-anisotropic layer 36*c* and the fourth optically-anisotropic layer 36*d* are the same. Accordingly, the right circularly polarized light $I_{R2}$ and the left circularly polarized light $I_{L2}$ transmitted through the first optically-anisotropic layer 36*a* to the fourth optically-anisotropic layer 36*d* are diffracted at substantially the same angle, and travel in the same direction (substantially parallel).

As described above, the transmissive liquid crystal diffraction element according to the embodiment of the present invention can diffract polarized light components (right circularly polarized light and left circularly polarized light) in the same direction, and thus can diffract unpolarized light with high efficiency.

Here, as shown in FIG. 7, even in a case where only a combination of the first optically-anisotropic layer 36*a* and the second optically-anisotropic layer 36*b* is used, the right circularly polarized light $I_R$ and the left circularly polarized light $I_L$ that are incident can be diffracted in the same direction. However, in the optically-anisotropic layer having the configuration in which the equiphase surface is tilted with respect to the main surface, in order to make the action of diffraction not to work depending on the angle of incident light, the turning direction of circularly polarized light, and the like, the diffraction angle in the optically-anisotropic layer needs to be increased. Therefore, in a case where only a combination of the first optically-anisotropic layer 36*a* and the second optically-anisotropic layer 36*b* is used, only a transmissive liquid crystal diffraction element that diffracts light at a large diffraction angle can be obtained, and right circularly polarized light and left circularly polarized light cannot be diffracted in the same direction at a small diffraction angle.

On the other hand, the transmissive liquid crystal diffraction element according to the embodiment of the present invention includes four optically-anisotropic layers of the first optically-anisotropic layer 36*a* to the fourth optically-anisotropic layer 36*d*, in which a combination (hereinafter, also referred to as a combination 1) of the first optically-anisotropic layer 36*a* and the second optically-anisotropic layer 36*b* diffracts right circularly polarized light and left circularly polarized light that are incident in the same direction at a large diffraction angle, and a combination (hereinafter, also referred to as a combination 2) of the third optically-anisotropic layer 36*c* and the fourth optically-anisotropic layer 36*d* diffracts the right circularly polarized light and the left circularly polarized light diffracted by the combination 1 in a direction opposite to the diffraction direction of the combination 1 at a large angle. As a result, as the transmissive liquid crystal diffraction element, right circularly polarized light and left circularly polarized light can be diffracted in the same direction at a small diffraction angle of the difference between the diffraction angle of the combination 1 and the diffraction angle of the combination 2.

Here, in a case where the single period of the liquid crystal alignment pattern of the first optically-anisotropic layer 36*a* and the second optically-anisotropic layer 36*b* is represented by $\Lambda_1$ and the single period of the liquid crystal alignment pattern of the third optically-anisotropic layer 36*c* and the fourth optically-anisotropic layer 36*d* is represented by $\Lambda_2$, the final diffraction angle as the transmissive liquid crystal diffraction element 10 is determined by an absolute value of $\Lambda_1 \cdot \Lambda_2 / (\Lambda_1 - \Lambda_2)$.

In addition, the diffraction angle of each of the first optically-anisotropic layer 36*a* to the fourth optically-anisotropic layer 36*d* is preferably 50° to 130°, more preferably 60° to 120°, and still more preferably 70° to 110°. By adjusting the diffraction angle of the optically-anisotropic layer to be in this range, the action of diffraction not to occur can be made to work depending on the angle of incident light, the turning direction of circularly polarized light, and the like.

Here, the transmissive liquid crystal diffraction element according to the embodiment of the present invention is not limited to the configuration where it includes only the first optically-anisotropic layer 36*a* to the fourth optically-anisotropic layer 36*d*. As described above, each of the optically-anisotropic layers 36 in the transmissive liquid crystal diffraction element may be laminated on the support 30 and the alignment film 32, or may be laminated on the alignment film 32.

Figure 8:
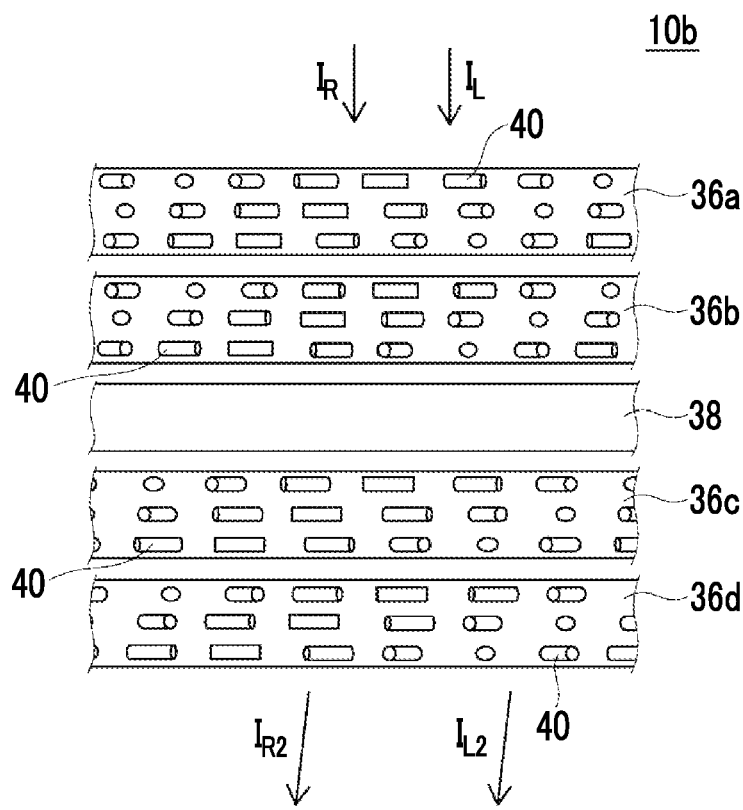
FIG. 8 is a diagram conceptually showing another example of the transmissive liquid crystal diffraction element according to the present invention.

In addition, the transmissive liquid crystal diffraction element according to the embodiment of the present invention may include another layer. For example, the transmissive liquid crystal diffraction element may include a C-plate that is provided between the optically-anisotropic layers. For example, a transmissive liquid crystal diffraction element 10b shown in FIG. 8 includes a C-plate 38 that is provided between the second optically-anisotropic layer 36b and the third optically-anisotropic layer 36c.

As described above, the optically-anisotropic layer 36 converts incident circularly polarized light into circularly polarized light having an opposite turning direction. However, the circularly polarized light may be converted into elliptically polarized light without being converted into circularly polarized light having a completely opposite direction. In the transmissive liquid crystal diffraction element, in a case where the light converted by one optically-anisotropic layer is elliptically polarized light, the action of the next optically-anisotropic layer cannot be appropriately obtained, and the diffraction efficiency may decrease.

Therefore, by adopting the configuration in which the C-plate 38 is provided between the optically-anisotropic layers, the elliptically polarized light emitted from one optically-anisotropic layer can be converted into circularly polarized light by imparting a retardation to the elliptically polarized light. As a result, the action of the next optically-anisotropic layer cannot be appropriately obtained, and the diffraction efficiency can be increased.

Even in a case where the C-plate is provided between the optically-anisotropic layers, the C-plate does not affect the diffraction. Therefore, the same action of diffraction as that of the example shown in FIG. 7 can be obtained as the transmissive liquid crystal diffraction element.

As a retardation layer, a C-plate and an A-Plate can be appropriately used as long as they can impart a retardation to the elliptically polarized light emitted from the first optically-anisotropic layer 36a.

A thickness direction retardation of the retardation layer may be appropriately set depending on the incidence angle of light, the configuration of the first optically-anisotropic layer 36a, and the like such that the elliptically polarized light emitted from the first optically-anisotropic layer 36a can be converted into circularly polarized light. As the index, $Nz=Rth/Re+0.5$ can be used. Here, Rth represents a thickness direction retardation, and Re represents an in-plane direction retardation. Nz is preferably 0.1 to 1.1, more preferably 0.8 to 0.2, and still more preferably 0.7 to 0.3.

In addition, in the present invention, it is preferable that, in at least one combination among the combination 1 of the first optically-anisotropic layer 36a and the second optically-anisotropic layer 36b and the combination 2 of the third optically-anisotropic layer 36c and the fourth optically-anisotropic layer 36d, the liquid crystal compound of one optically-anisotropic layer is a rod-like liquid crystal compound, and the liquid crystal compound of the other optically-anisotropic layer is a disk-like liquid crystal compound.

Figure 9:
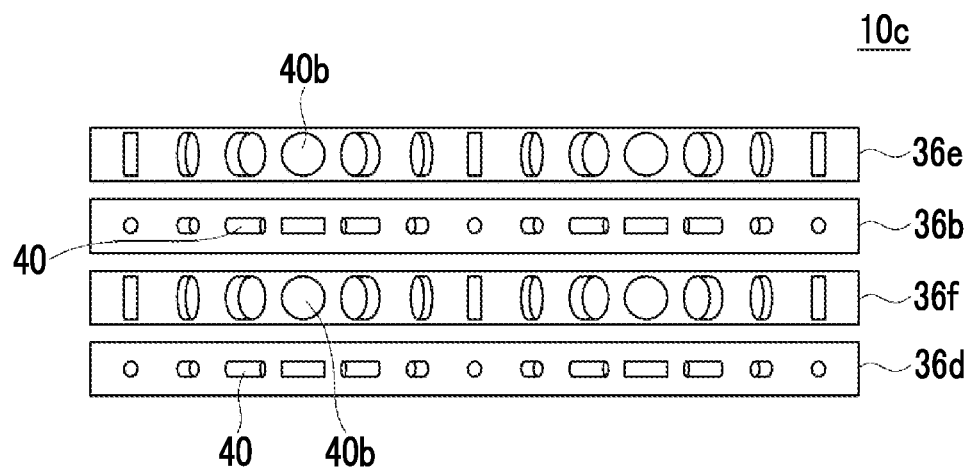
FIG. 9 is a diagram conceptually showing another example of the transmissive liquid crystal diffraction element according to the present invention.

FIG. 9 is a diagram conceptually showing another example of the transmissive liquid crystal diffraction element according to the embodiment of the present invention.

A transmissive liquid crystal diffraction element 10c shown in FIG. 9 includes a first optically-anisotropic layer 36e, a second optically-anisotropic layer 36b, a third optically-anisotropic layer 36f, and a fourth optically-anisotropic layer 36d. In FIG. 9, in order to simplify the drawing to clarify a configuration of the transmissive liquid crystal diffraction element 10c, only the liquid crystal compound 40 on the surface of each of the optically-anisotropic layers is conceptually shown. However, as in the example shown in FIG. 1 and the like, each of the optically-anisotropic layers has a structure in which the liquid crystal compounds are laminated in the thickness direction and where optical axes of the liquid crystal compounds 40 laminated in the thickness direction are twisted in the same direction.

In the transmissive liquid crystal diffraction element 10c, in the combination 1 of the first optically-anisotropic layer 36e and the second optically-anisotropic layer 36b, the liquid crystal compound of the first optically-anisotropic layer 36e is a disk-like liquid crystal compound 40b, and the liquid crystal compound of the second optically-anisotropic layer 36b is a rod-like liquid crystal compound 40. In the combination 2 of the third optically-anisotropic layer 36f and the fourth optically-anisotropic layer 36d, the liquid crystal compound of the third optically-anisotropic layer 36f is the disk-like liquid crystal compound 40b, and the liquid crystal compound of the fourth optically-anisotropic layer 36d is the rod-like liquid crystal compound 40.

Since the second optically-anisotropic layer 36b and the fourth optically-anisotropic layer 36d have the same configuration as the second optically-anisotropic layer 36b and the fourth optically-anisotropic layer 36d shown in FIG. 1, respectively, the description thereof will not be repeated.

The first optically-anisotropic layer 36e has the same configuration as the first optically-anisotropic layer 36a shown in FIG. 1, except that the first optically-anisotropic layer 36e is formed of the disk-like liquid crystal compound 40b. The direction of the optical axis of the disk-like liquid crystal compound 40b extends in a direction perpendicular to a disk plane. Accordingly, in the first optically-anisotropic layer 36e, the disk-like liquid crystal compound 40b is aligned such that the disk plane is perpendicular to an interface of the first optically-anisotropic layer 36e.

The first optically-anisotropic layer 36e has a liquid crystal alignment pattern in which a direction of an optical axis derived from the liquid crystal compound changes while continuously rotating in at least one in-plane direction, and a rotation direction of the optical axis is opposite to a rotation direction of the optical axis in the liquid crystal alignment pattern of the second optically-anisotropic layer 36b. In addition, in the first optically-anisotropic layer 36e, the optical axis derived from the liquid crystal compound is twisted in the thickness direction, and a twisted direction thereof is opposite to the twisted direction of the optical axis in the thickness direction of the second optically-anisotropic layer 36b. In addition, a single period of the liquid crystal alignment pattern in the first optically-anisotropic layer 36e and a single period of the liquid crystal alignment pattern in the second optically-anisotropic layer 36b are the same.

The third optically-anisotropic layer 36f has the same configuration as the third optically-anisotropic layer 36c shown in FIG. 1, except that the third optically-anisotropic layer 36f is formed of the disk-like liquid crystal compound 40b. The direction of the optical axis of the disk-like liquid crystal compound 40b extends in a direction perpendicular to a disk plane. Accordingly, in the third optically-anisotropic layer 36f, the disk-like liquid crystal compound 40b is aligned such that the disk plane is perpendicular to an interface of the third optically-anisotropic layer 36f.

The third optically-anisotropic layer 36f has a liquid crystal alignment pattern in which a direction of an optical axis derived from the liquid crystal compound changes while continuously rotating in at least one in-plane direction, and a rotation direction of the optical axis is opposite to a rotation direction of the optical axis in the liquid crystal alignment pattern of the fourth optically-anisotropic layer 36d. In addition, in the third optically-anisotropic layer 36f, the optical axis derived from the liquid crystal compound is twisted in the thickness direction, and a twisted direction thereof is opposite to the twisted direction of the optical axis in the thickness direction of the fourth optically-anisotropic layer 36d. In addition, a single period in the liquid crystal alignment pattern of the third optically-anisotropic layer 36f is the same as a single period in the liquid crystal alignment pattern of the fourth optically-anisotropic layer 36d, and is different from a single period in the liquid crystal alignment pattern of the first optically-anisotropic layer 36e.

This way, in at least one combination among the combination 1 of the first optically-anisotropic layer 36a and the second optically-anisotropic layer 36b and the combination 2 of the third optically-anisotropic layer 36c and the fourth optically-anisotropic layer 36d, the liquid crystal compound of one optically-anisotropic layer is a rod-like liquid crystal compound, and the liquid crystal compound of the other optically-anisotropic layer is a disk-like liquid crystal compound. With this configuration, the thickness direction retardation Rth in each of the combinations can be approximated to zero. As a result, in a case where light is incident into the transmissive liquid crystal diffraction element from an oblique direction, a change in the in-plane retardation Re is small. Therefore, the incidence angle dependence of the diffraction performance such as the diffraction efficiency can be improved. As a result, the diffraction efficiency of the transmissive liquid crystal diffraction element can be further improved.

In addition, in the liquid crystal alignment pattern of the optically-anisotropic layer shown in FIG. 3, the arrangement axis D is present in the one in-plane direction, and the optical axis 40A of the liquid crystal compound 40 continuously rotates in the one in-plane direction along the arrangement axis D direction.

However, the present invention is not limited thereto, and various configurations can be used as long as the optical axis 40A of the liquid crystal compound 40 in the optically-anisotropic layer continuously rotates in the one in-plane direction.

Figure 10:
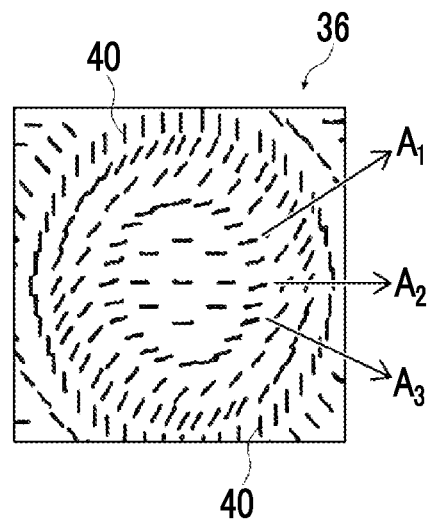
FIG. 10 is a plan view conceptually showing the optically-anisotropic layer in the other example of the transmissive liquid crystal diffraction element according to the present invention.

For example, as conceptually shown in a plan view of FIG. 10, the optically-anisotropic layer 36 may be configured to include the liquid crystal alignment pattern in a radial shape. In the optically-anisotropic layer 36 shown in FIG. 10, the direction of the optical axis of the liquid crystal compound 40 changes while continuously rotating in a plurality of directions from the center toward the outer side of the optically-anisotropic layer 36, for example, a direction indicated by an arrow $A_1$, a direction indicated by an arrow $A_2$, a direction indicated by an arrow $A_3$, or . . . . That is, the arrows $A_1$, $A_2$, and $A_3$ are arrangement axes.

In addition, as shown in FIG. 10, the optical axis of the liquid crystal compound 40 changes while rotating in the same direction from the center toward the outer side of the optically-anisotropic layer 36. In the aspect shown in FIG. 10, counterclockwise alignment is shown. The rotation directions in which the optical axes rotate and change along the respective arrows $A_1$, $A_2$, and $A_3$ in FIG. 10 are counterclockwise from the center toward the outer side.

In the radial liquid crystal alignment pattern, a line that connects liquid crystal compounds of which optical axes face the same direction has a circular shape, and a circular line segment is a concentric circular pattern.

In the optically-anisotropic layer 36 having the radial liquid crystal alignment pattern, in a case where incident light is diffracted along each of the arrangement axes (for example, $A_1$ to $A_3$) such that an azimuth direction faces the center side, transmitted light can be collected. Alternatively, in a case where incident light is diffracted along each of the arrangement axes (for example, $A_1$ to $A_3$) such that an azimuth direction faces the outer side, transmitted light can be diffused. Whether or not transmitted light is diffracted toward the center side or toward the outer side depends on the polarization state of the incident light and the rotation direction of the optical axis in the liquid crystal alignment pattern.

Here, in the single optically-anisotropic layer having the radial liquid crystal alignment pattern, one circularly polarized light is collected, and another circularly polarized light is diffused. Therefore, the efficiency is about 50%, for example, as a condenser lens of collecting unpolarized light.

On the other hand, in the present invention, the liquid crystal alignment pattern of the first optically-anisotropic layer to the fourth optically-anisotropic layer is the radial pattern such that right circularly polarized light and left circularly polarized light can be collected or diffused in the same direction. Therefore, a lens that can collect or diffuse even unpolarized light with high efficiency can be obtained.

In the transmissive liquid crystal diffraction element according to the embodiment of the present invention, in a case where the liquid crystal alignment pattern of the first optically-anisotropic layer to the fourth optically-anisotropic layer is the above-described radial pattern, it is preferable that, in at least one combination among the combination 1 of the first optically-anisotropic layer and the second optically-anisotropic layer and the combination 2 of the third optically-anisotropic layer and the fourth optically-anisotropic layer, the single period of the liquid crystal alignment pattern gradually changes in the one in-plane direction.

Specifically, for example, in a case where the single period of the liquid crystal alignment pattern of the combination 1 is less than the single period of the liquid crystal alignment pattern of the combination 2, that is, in a case where the diffraction angle of the combination 1 is more than the diffraction angle of the combination 2, it is preferable that the single period of the liquid crystal alignment pattern of the combination 1 gradually decreases from the center toward the outer side of the radial pattern. Alternatively, it is also preferable that the single period of the liquid crystal alignment pattern of the combination 2 gradually increases from the center toward the outer side of the radial pattern. Alternatively, the single period of the liquid crystal alignment pattern of the combination 1 may gradually decrease from the center toward the outer side of the radial pattern, and the single period of the liquid crystal alignment pattern of the combination 2 may gradually increase from the center toward the outer side of the radial pattern. With the above-described configuration, from the center toward the outer side of the radial pattern, the diffraction angle of the combination 1 is larger, and/or the diffraction angle of the combination 2 is smaller. Therefore, an absolute value of a difference between the diffraction angle of the combination 1 and the diffraction angle of the combination 2 increases from the center toward the outer side of the radial pattern. Accordingly, light incident into the vicinity of the outer side of the transmissive liquid crystal diffraction element is diffracted more largely than light incident into the vicinity of the center of the transmissive liquid crystal diffraction element. Therefore, the transmissive liquid crystal diffraction element can function more suitably as a condenser lens or a divergent lens.

In a case where the single period of the liquid crystal alignment pattern of the combination 1 is more than the single period of the liquid crystal alignment pattern of the combination 2, it is preferable that the single period of the liquid crystal alignment pattern of the combination 1 may gradually increases from the center toward the outer side of the radial pattern and/or the single period of the liquid crystal alignment pattern of the combination 2 may gradually decrease from the center toward the outer side of the radial pattern.

In this configuration, a relationship of the single period $\Lambda_1$ of the liquid crystal alignment pattern of the combination 1 (first optically-anisotropic layer) and the single period $\Lambda_1$ of the liquid crystal alignment pattern of the combination 2 (third optically-anisotropic layer) can be represented by a difference between reciprocals thereof, and the reciprocal $(1/\Lambda_1)$ of the single period $\Lambda_1$ of the liquid crystal alignment pattern of the combination 1 (first optically-anisotropic layer) and the reciprocal $(1/\Lambda_2)$ of the single period $\Lambda_1$ of the liquid crystal alignment pattern of the combination 2 (third optically-anisotropic layer) a difference between is a reciprocal of a period $\Lambda$ of a composite element of the combination 1 and the combination 2. Therefore by setting the $\Lambda$ to have a desired distribution (for example, the $\Lambda$ gradually decreases from the center portion toward the outer side portion of the radial liquid crystal alignment pattern), the composite element can be used as a light collecting or diffusing element such as a lens.

Figure 14:
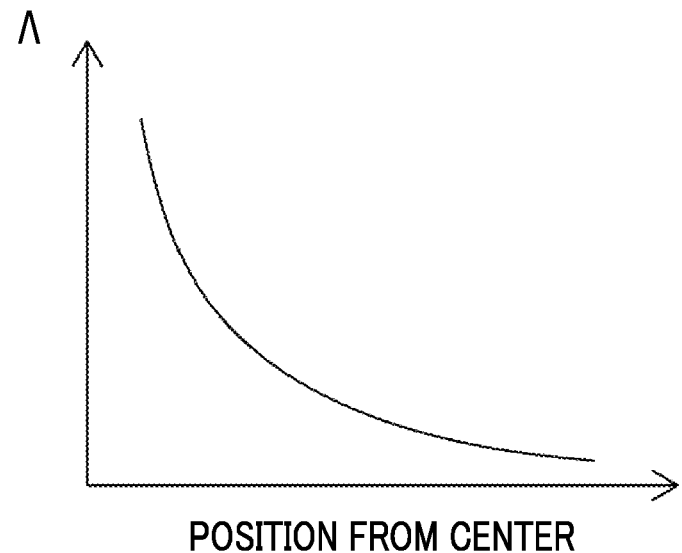
FIG. 14 is a graph conceptually showing a relationship between a single period of the first optically-anisotropic layer and a single period of the third optically-anisotropic layer in the other example of the transmissive liquid crystal diffraction element according to the present invention.

FIG. 14 is a graph showing a relationship between the $\Lambda$ and a position (x) from the center of the optically-anisotropic layer.

Figure 12:
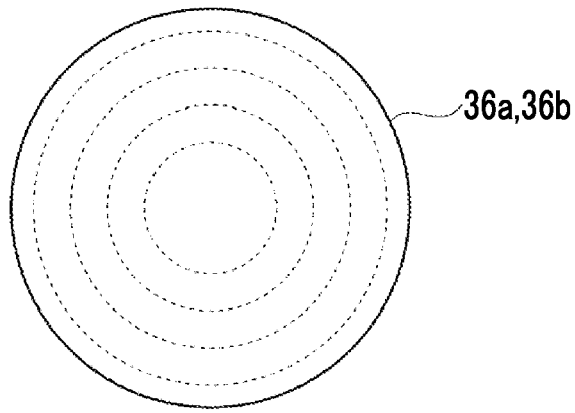
FIG. 12 is a front view conceptually showing first and second optically-anisotropic layers in the other example of the transmissive liquid crystal diffraction element according to the present invention.
Figure 13:
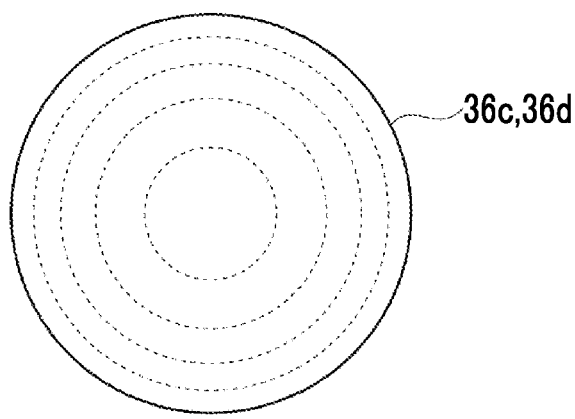
FIG. 13 is a front view conceptually showing third and fourth optically-anisotropic layers in the other example of the transmissive liquid crystal diffraction element according to the present invention.

For example, FIG. 12 is a conceptual diagram showing the liquid crystal alignment pattern of the first optically-anisotropic layer 36a and the second optically-anisotropic layer 36b (combination 1). FIG. 13 is a conceptual diagram showing the liquid crystal alignment pattern of the third optically-anisotropic layer 36c and the fourth optically-anisotropic layer 36d (combination 2). In FIGS. 12 and 13, an interval between the single periods of the liquid crystal alignment pattern of the optically-anisotropic layer is indicated by a broken line.

As shown in FIG. 12, the single period of the liquid crystal alignment pattern of the first optically-anisotropic layer 36a and the second optically-anisotropic layer 36b (combination 1) is fixed. In addition, as shown in FIG. 13, the single period of the liquid crystal alignment pattern of the third optically-anisotropic layer 36c and the fourth optically-anisotropic layer 36d (combination 2) gradually decreases from the center toward the outer side of the radial pattern. In addition, the example shown in FIGS. 12 and 13 is an example where the single period of the liquid crystal alignment pattern of the combination 2 is less than the single period of the liquid crystal alignment pattern of the combination 1.

An example of the action of the transmissive liquid crystal diffraction element including the first optically-anisotropic layer 36a to the fourth optically-anisotropic layer 36d having the liquid crystal alignment pattern will be described using FIG. 15.

Figure 15:
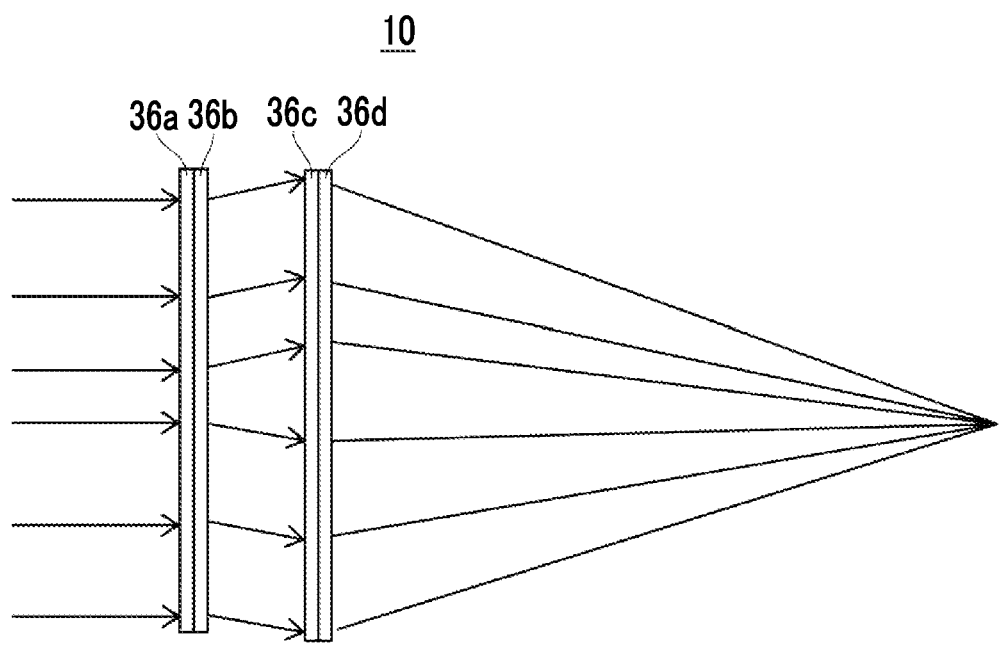
FIG. 15 is a conceptual diagram showing an action of the other example of the transmissive liquid crystal diffraction element according to the present invention.

Parallel light is incident from the first optically-anisotropic layer 36a side of the transmissive liquid crystal diffraction element 10 shown in FIG. 15. The incident parallel light is diffracted by the combination 1 toward the outer side at a predetermined angle. In this case, the single period of the liquid crystal alignment pattern of the combination 1 is fixed, and thus the diffraction angle is fixed at any in-plane position of the optically-anisotropic layer.

The light diffracted by the combination 1 is incident into the combination 2 and is diffracted by the combination 2 toward the center side at a predetermined angle. In this case, the single period of the liquid crystal alignment pattern of the combination 2 gradually decreases from the center toward the outer side. Therefore, the diffraction angle increases from the center side toward the outer side in a plane of the optically-anisotropic layer. As a result, the diffracted light is collected as shown in FIG. 15.

Figure 16:
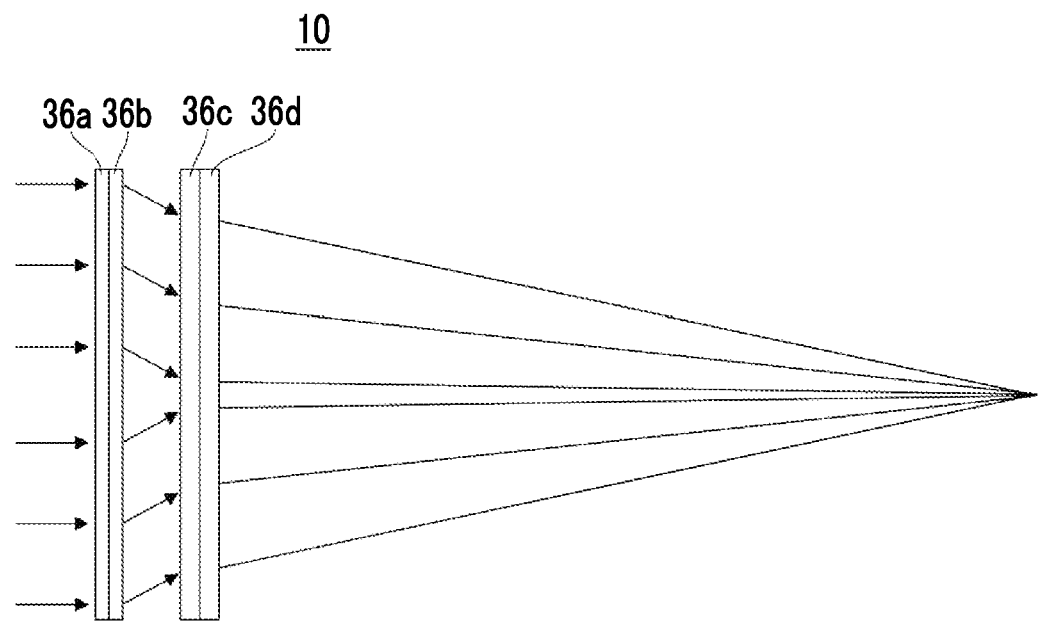
FIG. 16 is a conceptual diagram showing the action of the other example of the transmissive liquid crystal diffraction element according to the present invention.

In the example shown in FIG. 15, the combination 1 diffracts light toward the outer side, and the combination 2 diffracts the light toward the center side. However, the present invention is not limited to this configuration. As shown in FIG. 16, the combination 1 may diffract light toward the center side, and the combination 2 may diffract the light toward the outer side. In a case where using the combination 1 diffracts light toward the center side and the combination 2 diffracts the light toward the outer side and collecting the light, the diffraction angle of the combination 1 may be more than the diffraction angle of the combination 2.

Here, the optically-anisotropic layer 36 shown in FIG. 2 has the configuration in which the optical axis of the liquid crystal compound is parallel to the main surface of the optically-anisotropic layer, but the present invention is not limited thereto. In the optically-anisotropic layer, the optical axis of the liquid crystal compound is tilted with respect to the main surface of the optically-anisotropic layer.

In addition, at least one of the optically-anisotropic layers may have a configuration in which a rod-like liquid crystal layer where a rod-like liquid crystal compound is aligned in the liquid crystal alignment pattern and a disk-like liquid crystal layer where a disk-like liquid crystal compound is aligned in the liquid crystal alignment pattern are alternately laminated. It is more preferable that all of the optically-anisotropic layers have the configuration in which the rod-like liquid crystal layer and the disk-like liquid crystal layer are alternately laminated.

In a case where the optically-anisotropic layer has the configuration in which the rod-like liquid crystal layer and the disk-like liquid crystal layer are alternately laminated, the thickness direction retardation Rth of the optically-anisotropic layer can be approximated to zero. As a result, in a case where light is incident into the optically-anisotropic layer from an oblique direction, a change in the in-plane retardation Re is small. Therefore, the incidence angle dependence of the diffraction performance such as the diffraction efficiency can be improved.

In addition, diffracted light is produced in various places in the thickness direction of a layer that causes diffraction to occur. Therefore, it is preferable that Rth is close to zero in any place in the thickness direction of the layer that causes diffraction to occur. It is more preferable that Rth is offset in each of the places in the thickness direction of the layer that causes diffraction to occur. Accordingly, the Rths of the rod-like liquid crystal layer and the disk-like liquid crystal layer that are alternately laminated have a positive and negative relationship with the Rth of a layer adjacent thereto, and an absolute value of the Rth of each of the layers is preferably about 10 to 200 nm.

By providing the above-described optically-anisotropic layer, the diffraction efficiency of the transmissive liquid crystal diffraction element can be further improved.

It is preferable that the total thickness of the rod-like liquid crystal layer and the disk-like liquid crystal layer is not excessively large with respect to the wavelength of light to be incident, and each of the thickness of the rod-like liquid crystal layer and the thickness of the disk-like liquid crystal layer is preferably 0.1 μm to 5 μm, more preferably 0.1 μm to 2 μm, and still more preferably 0.1 μm to 0.5 μm.

In addition, in the example shown in FIG. 2, the optically-anisotropic layer 36 has the configuration in which the twisted angle per unit length is fixed in the twisted structure of the optical axis derived from the liquid crystal compound in the thickness direction. However, the present invention is not limited to this configuration. The optically-anisotropic layer 36 has the configuration in which the twisted angle per unit length may gradually change in the twisted structure of the optical axis derived from the liquid crystal compound in the thickness direction.

Hereinabove, the transmissive liquid crystal diffraction element according to the embodiment of the present invention has been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Comparative Example 1

<Preparation of Transmissive Liquid Crystal Diffraction Element>
(Formation of Alignment Film)

A glass substrate was used as the support. The following coating liquid for forming an alignment film was applied to the support by spin coating. The support on which the coating film of the coating liquid for forming an alignment film was formed was dried using a hot plate at 60° C. for 60 seconds. As a result, an alignment film P-2 was formed.

| Coating Liquid For Forming Alignment Film | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

Material for Photo-Alignment

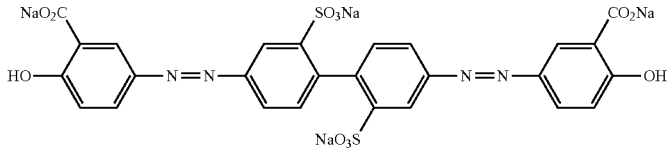

(Exposure of Alignment Film)

By irradiating the obtained alignment film P-2 with polarized ultraviolet light (50 mJ/cm$^2$, using an ultra-high pressure mercury lamp), the alignment film P-2 was exposed.

The alignment film was exposed using the exposure device shown in FIG. 4 to form an alignment film P-2 having an alignment pattern. In the exposure device, a laser that emits laser light having a wavelength (325 nm) was used as the laser. The exposure amount of the interference light was 300 mJ/cm$^2$. An intersecting angle (intersecting angle α) between the two laser beams was adjusted such that the single period Λ (the length over which the optical axis rotates by 180°) of an alignment pattern formed by interference of the two laser beams was 10 μm.

(Formation of Optically-Anisotropic Layer)

As the liquid crystal composition forming the optically-anisotropic layer, the following composition B-1 was prepared.

| Composition B-1 | |
|---|---|
| Rod-like liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2000.00 parts by mass |

Rod-like liquid crystal compound L-1 (including the following structures at a mass ratio shown on the right side)

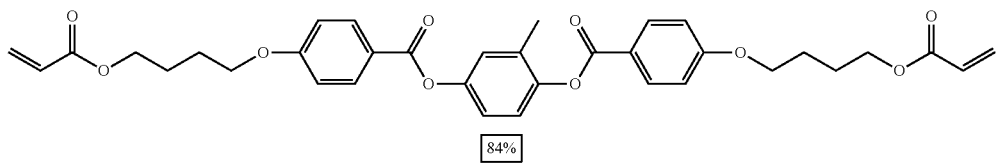 [SMILES: C=CC(=O)OCCCCOc1ccc(C(=O)Oc2ccc(OC(=O)c3ccc(OCCCCOC(=O)C=C)cc3)c(C)c2)cc1]

| Composition B-1 |
|---|

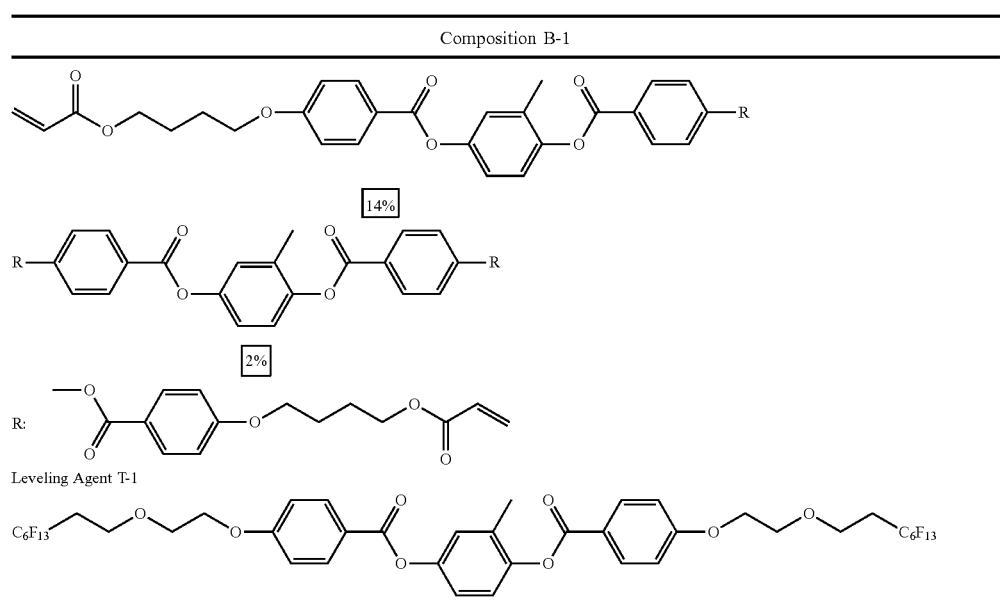

Leveling Agent T-1

The optically-anisotropic layer was formed by applying multiple layers of the composition B-1 to the alignment film P-2. The following processes were repeated, the processes including: preparing a first liquid crystal immobilized layer by applying the composition B-1 for forming the first layer to the alignment film, heating the composition B-1, cooling the composition B-1, and irradiating the composition B-1 with ultraviolet light for curing; and preparing a second or subsequent liquid crystal immobilized layer by applying the composition B-1 for forming the second or subsequent layer to the formed liquid crystal immobilized layer, heating the composition B-1, cooling the composition B-1, and irradiating the composition B-1 with ultraviolet light for curing as described above.

Regarding the first immobilized liquid crystal layer, the following composition B-1 was applied to the alignment film P-2 to form a coating film, the coating film was heated using a hot plate at 80° C., and the coating film was irradiated with ultraviolet light having a wavelength of 365 nm at an irradiation dose of 300 mJ/cm$^2$ using a high pressure mercury lamp in a nitrogen atmosphere at 80° C. As a result, the alignment of the liquid crystal compound was immobilized.

Regarding the second or subsequent liquid crystal immobilized layer, the composition was applied to the first immobilized liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired film thickness, the optically-anisotropic layer was formed.

A difference Δn in refractive index of the cured layer of a composition B-1 was obtained by applying the composition B-1 a support with an alignment film for retardation measurement that was prepared separately, aligning the director of the liquid crystal compound to be parallel to the substrate, irradiating the liquid crystal compound with ultraviolet irradiation for immobilization to obtain a liquid crystal immobilized layer, and measuring the retardation Re(λ) and the film thickness of the liquid crystal immobilized layer. Δn$_λ$ can be calculated by dividing the retardation Re(λ) by the film thickness. The retardation Re(λ) was measured by measuring a desired wavelength using Axoscan (manufactured by Axometrix inc.) and measuring the film thickness using a SEM. In the expression of Re(λ), λ represents the wavelength of incidence light. In the following description, the wavelength λ of incidence light was 600 nm.

Finally, in the optically-anisotropic layer, Δn$_{600}$×thickness=Re(600) of the liquid crystals was 300 nm, and it was verified with a polarization microscope that the optically-anisotropic layer was periodically aligned. In addition, the twisted angle of the optically-anisotropic layer in the thickness direction was 0°. In addition, in a cross sectional image with a SEM, bright and dark lines that were perpendicular to the lower interface (interface with the glass substrate) of the optically-anisotropic layer was observed. The bright and dark lines were observed with the configuration where the liquid crystal compounds aligned in the same direction were laminated in the thickness direction.

This single optically-anisotropic layer was set as a transmissive liquid crystal diffraction element according to Comparative Example 1.

Comparative Example 2

An optically-anisotropic layer was prepared using the same method as that of Comparative Example 1, and was rotated by 180 degrees such that the rotation direction of the optical axis derived from the liquid crystal compound that changed while continuously rotating in one in-plane direction was opposite to that of the optically-anisotropic layer. As a result, an optically-anisotropic layer according to Comparative Example 2 was obtained.

Table 1 below shows the configurations of Comparative Example 1 and Comparative Example 2. In Table 1, the number of lines represents the number of periods per 1 mm, and is the number obtained by dividing 1000 (μm) by the single period (μm). In addition, the tilt angle refers to an angle between bright and dark lines observed in the SEM cross section and the perpendicular line of the main surface.

TABLE 1

|  | Number of Lines (Lines/μm) | Single Period (μm) | In-Plane Rotation | Re | Twisted Angle (°) | Tilt Angle (°) |
|---|---|---|---|---|---|---|
| Comparative Example 1 | 100 | 10 | Right | 300 | 0 | 0 |
| Comparative Example 2 | 100 | 10 | Left | 300 | 0 | 0 |

Example 1

(Formation of First Optically-Anisotropic Layer)

An alignment film was formed using the same method as that of Comparative Example 1, except that the single period Λ of the alignment pattern was 1 μm in the formation of the alignment film according to Comparative Example 1.

A first optically-anisotropic layer was formed using the same method as that of Comparative Example 1, except that the following composition B-2 was used instead of the composition B-1 in the formation of the optically-anisotropic layer according to Comparative Example 1.

As the liquid crystal composition forming the first optically-anisotropic layer, the following composition B-2 was used.

| Composition B-2 | |
|---|---|
| Rod-like liquid crystal compound L-1 | 100.00 parts by mass |
| Chiral agent Ch-A | 0.24 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2000.00 parts by mass |

Chiral agent Ch-A-

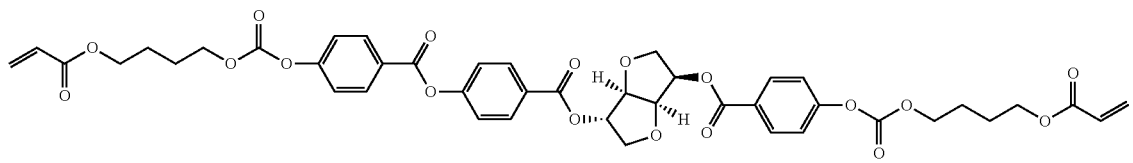 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)OCCCCOC(=O)C=C)cc3)cc2)cc1]

(Formation of Second Optically-Anisotropic Layer)

An alignment film was the same as that of Comparative Example 1, and the optically-anisotropic layer was rotated by 180 degrees such that the rotation direction of the optical axis derived from the liquid crystal compound that changed while continuously rotating in one in-plane direction was opposite to that of the first optically-anisotropic layer.

A second optically-anisotropic layer was formed using the same method as that of Comparative Example 1, except that the following composition B-3 was used instead of the composition B-1 in the formation of the optically-anisotropic layer according to Comparative Example 1.

As the liquid crystal composition forming the second optically-anisotropic layer, the following composition B-3 was used.

| Composition B-3 | |
|---|---|
| Rod-like liquid crystal compound L-1 | 100.00 parts by mass |
| Chiral agent Ch-B | 0.41 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2000.00 parts by mass |

Chiral Agent Ch-B-

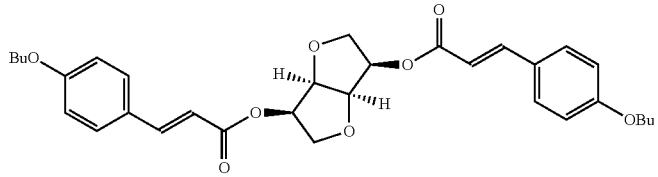

(Formation of Third Optically-Anisotropic Layer)

A third optically-anisotropic layer was formed using the same method as that of the first optically-anisotropic layer, except that the single period Λ of the alignment pattern of the alignment film was 1.111 μm in the formation of the first optically-anisotropic layer.

(Formation of Fourth Optically-Anisotropic Layer)

A fourth optically-anisotropic layer was formed using the same method as that of the second optically-anisotropic layer, except that the single period Λ of the alignment pattern of the alignment film was 1.111 μm in the formation of the second optically-anisotropic layer.

Finally, in the first optically-anisotropic layer, $\Delta n_{600} \times$ thickness=Re(600) of the liquid crystals was 300 nm, and it was verified with a polarization microscope that the first optically-anisotropic layer was periodically aligned. In addition, the twisted angle of the first optically-anisotropic layer in the thickness direction was 80° (right-twisted). In addition, in a cross sectional image with a SEM, bright and dark lines that were oblique to the lower interface (interface with the glass substrate) of the first optically-anisotropic layer was observed.

Finally, in the second optically-anisotropic layer, $\Delta n_{600} \times$ thickness=Re(600) of the liquid crystals was 300 nm, and it was verified with a polarization microscope that the second optically-anisotropic layer was periodically aligned. In addition, the twisted angle of the second optically-anisotropic layer in the thickness direction was −80° (left-twisted). In addition, in a cross sectional image with a SEM, bright and dark lines that were oblique to the lower interface of the second optically-anisotropic layer was observed. In this case, the oblique angle was the same as that of the angle of the first optically-anisotropic layer, and the tilt direction was opposite to that of the first optically-anisotropic layer.

Finally, in the third optically-anisotropic layer, $\Delta n_{600} \times$ thickness=Re(600) of the liquid crystals was 300 nm, and it was verified with a polarization microscope that the third optically-anisotropic layer was periodically aligned. In addition, the twisted angle of the third optically-anisotropic layer in the thickness direction was 80° (right-twisted). In addition, in a cross sectional image with a SEM, bright and dark lines that were oblique to the lower interface (interface with the glass substrate) of the third optically-anisotropic layer were observed. In this case, the oblique angle was different from that of the angle of the first optically-anisotropic layer, and the tilt direction was opposite to that of the first optically-anisotropic layer.

Finally, in the fourth optically-anisotropic layer, $\Delta n_{600} \times$ thickness=Re(600) of the liquid crystals was 300 nm, and it was verified with a polarization microscope that the fourth optically-anisotropic layer was periodically aligned. In addition, the twisted angle of the fourth optically-anisotropic layer in the thickness direction was −80° (left-twisted). In addition, in a cross sectional image with a SEM, bright and dark lines that were oblique to the lower interface of the fourth optically-anisotropic layer was observed. In this case, the oblique angle was the same as that of the angle of the third optically-anisotropic layer, and the tilt direction was opposite to that of the third optically-anisotropic layer.

The first optically-anisotropic layer to the fourth optically-anisotropic layer were laminated in this order to prepare a transmissive liquid crystal diffraction element according to Example 1. The size of the diffraction element was 20 square mm.

Table 2 below shows the configuration of the transmissive liquid crystal diffraction element according to Example 1.

TABLE 2

| | Optically-Anisotropic Layer | Number of Lines (Lines/μm) | Single Period (μm) | Absolute Value of Λ1-Λ2/ (Λ1-Λ2) | In-Plane Rotation | Re | Twisted Angle (°) | Tilt Angle (°) |
|---|---|---|---|---|---|---|---|---|
| Example 1 | First | 1000 | 1 | 10 | Right | 300 | 80 | 12.5 |
| | Second | 1000 | 1 | | Left | 300 | −80 | 12.5 |
| | Third | 900 | 1.111 | | Right | 300 | 80 | 13.9 |
| | Fourth | 900 | 1.111 | | Left | 300 | −80 | 13.9 |

Example 2

A transmissive liquid crystal diffraction element was prepared using the same method as that of Example 1, except that the single period of the third optically-anisotropic layer and the fourth optically-anisotropic layer was 0.909 μm.

Table 3 below shows the configuration of the transmissive liquid crystal diffraction element according to Example 2.

TABLE 3

| | Optically-Anisotropic Layer | Number of Lines (Lines/μm) | Single Period (μm) | Absolute Value of Λ1-Λ2/ (Λ1-Λ2) | In-Plane Rotation | Re | Twisted Angle (°) | Tilt Angle (°) |
|---|---|---|---|---|---|---|---|---|
| Example 2 | First | 1000 | 1 | 10 | Right | 300 | 80 | 12.5 |
| | Second | 1000 | 1 | | Left | 300 | −80 | 12.5 |
| | Third | 900 | 0.909 | | Right | 300 | 80 | 11.4 |
| | Fourth | 900 | 0.909 | | Left | 300 | −80 | 11.4 |

Evaluation

Straight light (diameter: 1 mm) of unpolarized light having a wavelength of 600 nm was incident into the prepared transmissive liquid crystal diffraction element from the normal direction of the main surface (in Examples, the main surface on the first optically-anisotropic layer side) of the transmissive liquid crystal diffraction element, and the diffraction intensity (diffraction efficiency) of first-order diffracted light was measured using a power meter. Criteria of the intensity (diffraction efficiency) are as follows.

A: the intensity (diffraction efficiency) was 90% or more.
B: the intensity (diffraction efficiency) was 80% or more.
C: the intensity (diffraction efficiency) was 70% or more.
D: the intensity (diffraction efficiency) was 60% or more.
E: the intensity (diffraction efficiency) was 50% or more.
F: the intensity (diffraction efficiency) was less than 50%.

The results are shown in Table 4 below.

TABLE 4

| | Diffraction Efficiency |
|---|---|
| Comparative Example 1 | F |
| Comparative Example 2 | F |
| Example 1 | A |
| Example 2 | A |

It can be seen from Table 1 that, in Examples of the present invention, a high diffraction efficiency can be obtained irrespective of unpolarized light. That is, it can be seen that different circularly polarized light components can be diffracted in the same direction.

Comparative Examples 11 and 12

Figure 11:
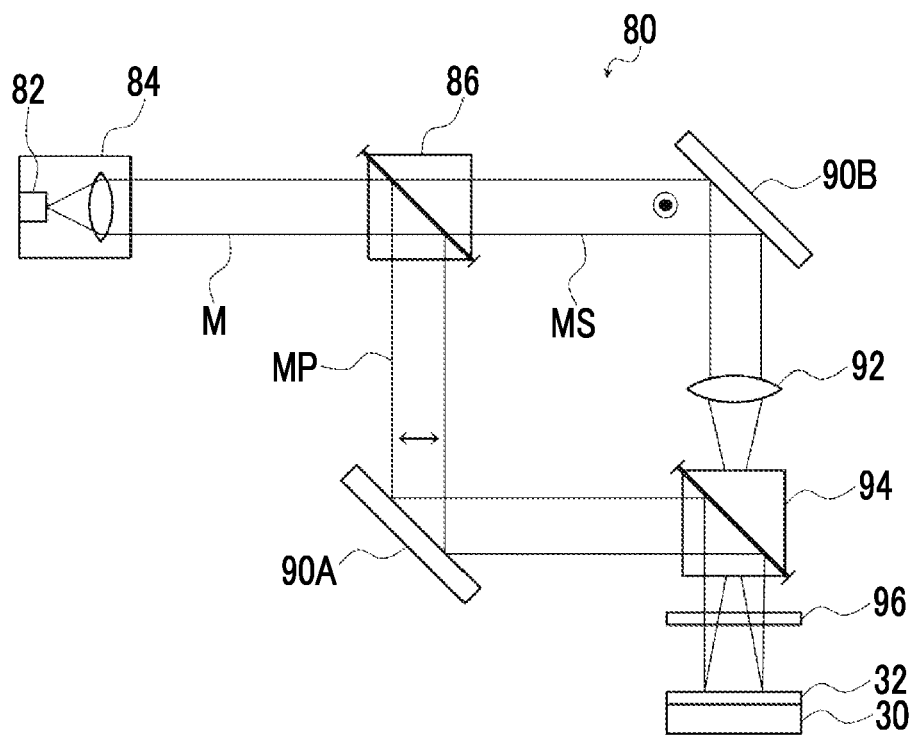
FIG. 11 is a conceptual diagram showing an example of an exposure device that exposes an alignment film for forming the optically-anisotropic layer shown in FIG. 10.

Transmissive liquid crystal diffraction elements were prepared using the same methods as those of Comparative Examples 1 and 2, respectively, except that a radial alignment pattern was formed with an exposure method described in WO2019/189818 using the exposure device shown in FIG. 11 as the exposure device of the alignment film. The size was 40 mm in diameter. The transmissive liquid crystal diffraction element acts as a condenser lens.

Table 5 below shows the configurations of Comparative Example 1 and Comparative Example 2.

TABLE 5

| | Number of Lines (Lines/μm) | | | Single Period (μm) | | | Focal Length (mm) | Tilt Angle (°) | | | In-Plane Rotation | Re | Twisted Angle (*) |
|---|---|---|---|---|---|---|---|---|---|---|---|---|---|
| | Center | Middle | End Portion | Center | Middle | End Portion | | Center | Middle | End Portion | | | |
| Comparative Example 11 | 0 | 50 | 100 | ∞ | 20 | 10 | 333 | — | 77.3 | 65.8 | Right | 300 | 0 |
| Comparative Example 12 | 0 | 50 | 100 | ∞ | 20 | 10 | 333 | — | 77.3 | 65.8 | Left | 300 | 0 |

Example 11

First optically-anisotropic layer to the fourth optically-anisotropic layer were formed to prepare a transmissive liquid crystal diffraction element using the same method as that of Example 1, except that a radial alignment pattern was formed with an exposure method described in WO2019/189818 using the exposure device shown in FIG. 11 as the exposure device of the alignment film. The size was 40 mm in diameter. The transmissive liquid crystal diffraction element acts as a condenser lens.

Table 6 below shows the configuration of the transmissive liquid crystal diffraction element according to Example 11.

TABLE 6

| | Optically-Aniso-tropic Layer | Number of Lines (Lines/μm) | | | Single Period (μm) | | | Absolute Value of Λ1-Λ2/(Λ1-Λ2) | | | Focal Length (mm) | Tilt Angle (°) | | | In-Plane Rota-tion | Re | Twist-ed Angle (°) |
|---|---|---|---|---|---|---|---|---|---|---|---|---|---|---|---|---|---|
| | | Cen-ter | Mid-dle | End Portion | Cen-ter | Mid-dle | End Portion | Cen-ter | Mid-dle | End Portion | | Cen-ter | Mid-dle | End Portion | | | |
| Example 11 | First | 1000 | 1000 | 1000 | 1 | 1 | 1 | ∞ | 20 | 10 | 333 | 12.5 | 12.5 | 12.5 | Right | 300 | 80 |
| | Second | 1000 | 1000 | 1000 | 1 | 1 | 1 | | | | | 12.5 | 12.5 | 12.5 | Left | 300 | −80 |
| | Third | 1000 | 950 | 900 | 1 | 1.053 | 1.111 | | | | | 12.5 | 13.2 | 13.9 | Right | 300 | 80 |
| | Fourth | 1000 | 950 | 900 | 1 | 1.053 | 1.111 | | | | | 12.5 | 13.2 | 13.9 | Left | 300 | −80 |

Example 12

First optically-anisotropic layer to the fourth optically-anisotropic layer were formed to prepare a transmissive liquid crystal diffraction element using the same method as that of Example 2, except that a radial alignment pattern was formed with an exposure method described in WO2019/189818 using the exposure device shown in FIG. 11 as the exposure device of the alignment film and each of the optically-anisotropic layers was formed such that the in-plane rotation direction thereof was opposite to that of Example 11. The size was 40 mm in diameter. The transmissive liquid crystal diffraction element acts as a condenser lens.

Table 7 below shows the configuration of the transmissive liquid crystal diffraction element according to Example 12.

TABLE 7

| | Optically-Aniso-tropic Layer | Number of Lines (Lines/μm) | | | Single Period (μm) | | | Absolute Value of Λ1-Λ2/(Λ1-Λ2) | | | Focal Length (mm) | Tilt Angle (°) | | | In-Plane Rota-tion | Re | Twist-ed Angle (°) |
|---|---|---|---|---|---|---|---|---|---|---|---|---|---|---|---|---|---|
| | | Cen-ter | Mid-dle | End Portion | Cen-ter | Mid-dle | End Portion | Cen-ter | Mid-dle | End Portion | | Cen-ter | Mid-dle | End Portion | | | |
| Example 12 | First | 1000 | 1000 | 1000 | 1 | 1 | 1 | ∞ | 20 | 10 | 333 | 12.5 | 12.5 | 12.5 | Left | 300 | 80 |
| | Second | 1000 | 1000 | 1000 | 1 | 1 | 1 | | | | | 12.5 | 12.5 | 12.5 | Right | 300 | −80 |
| | Third | 1000 | 1050 | 1100 | 1 | 0.952 | 0.909 | | | | | 12.5 | 11.9 | 11.4 | Left | 300 | 80 |
| | Fourth | 1000 | 1050 | 1100 | 1 | 0.952 | 0.909 | | | | | 12.5 | 11.9 | 11.4 | Right | 300 | −80 |

Evaluation

Straight light (diameter: 40 mm) of unpolarized light having a wavelength of 600 nm was incident into the prepared transmissive liquid crystal diffraction element from the normal direction of the main surface (in Examples, the main surface on the first optically-anisotropic layer side) of the transmissive liquid crystal diffraction element, and the diffraction intensity (diffraction efficiency) of light (first-order diffracted light) collected by the lens was measured using a power meter. Criteria of the intensity (diffraction efficiency) are as follows.

A: the intensity (diffraction efficiency) was 90% or more.
B: the intensity (diffraction efficiency) was 80% or more.
C: the intensity (diffraction efficiency) was 70% or more.
D: the intensity (diffraction efficiency) was 60% or more.
E: the intensity (diffraction efficiency) was 50% or more.
F: the intensity (diffraction efficiency) was less than 50%.
The results are shown in Table 8 below.

TABLE 8

| | Diffraction Efficiency |
|---|---|
| Comparative Example 11 | F |
| Comparative Example 12 | F |

TABLE 8-continued

| | Diffraction Efficiency |
|---|---|
| Example 11 | A |
| Example 12 | A |

It can be seen from Table 8 that, in Comparative Examples, the diffraction efficiency was less than or equal to half of that with respect to unpolarized light due to the polarization dependence, whereas in Examples of the present invention, a high diffraction efficiency can be obtained irrespective of unpolarized light. In addition, in a case where the lens was observed by visual inspection, an unnecessary image was observed due to diverging light of negative first-order light in Comparative Examples, whereas the unnecessary image was not substantially observed and an excellent lens corresponding to unpolarized light was able to be realized in Examples.

As can be seen from the above results, the effects of the present invention are obvious.

EXPLANATION OF REFERENCES 10, 10b: transmissive liquid crystal diffraction element
30: support
32: alignment film
36: optically-anisotropic layer
36a, 36e: first optically-anisotropic layer
36b: second optically-anisotropic layer
36c, 36f: third optically-anisotropic layer
36d: fourth optically-anisotropic layer
38: C-plate
40: liquid crystal compound (rod-like liquid crystal compound)
40b: disk-like liquid crystal compound
40A: optical axis
60, 80: exposure device
62, 82: laser
64, 84: light source
65: λ/2 plate
68: beam splitter
70A, 70B, 90A, 90B: mirror
72A, 72B, 96: λ/4 plate
86, 94: polarization beam splitter
92: lens
$I_R$, $I_{R1}$, $I_{R2}$: right circularly polarized light
$I_L$, $I_{L1}$, $I_{L2}$: left circularly polarized light
D, $A_1$, $A_2$, $A_3$: arrangement axis
R: region
Λ: single period
MA, MB: beam
$P_O$: linearly polarized light
$P_R$: right circularly polarized light
$P_L$: left circularly polarized light
M: laser light
MP: P polarized light
MS: S polarized light
α: angle
$L_1$, $L_2$, $L_4$, $L_5$: light

What is claimed is:

1. A transmissive liquid crystal diffraction element comprising:
a first optically-anisotropic layer to a fourth optically-anisotropic layer each of which has a liquid crystal alignment pattern in which a direction of an optical axis derived from a liquid crystal compound changes while continuously rotating in at least one in-plane direction,
wherein the optical axis derived from the liquid crystal compound in each of the first optically-anisotropic layer to the fourth optically-anisotropic layer is twisted in a thickness direction,
a rotation direction of the optical axis in the liquid crystal alignment pattern of the first optically-anisotropic layer and a rotation direction of the optical axis in the liquid crystal alignment pattern of the second optically-anisotropic layer are opposite to each other,
a rotation direction of the optical axis in the liquid crystal alignment pattern of the third optically-anisotropic layer and a rotation direction of the optical axis in the liquid crystal alignment pattern of the fourth optically-anisotropic layer are opposite to each other,
a twisted direction of the optical axis derived from the liquid crystal compound in the thickness direction of the first optically-anisotropic layer and a twisted direction of the optical axis derived from the liquid crystal compound in the thickness direction of the second optically-anisotropic layer are opposite to each other,
a twisted direction of the optical axis derived from the liquid crystal compound in the thickness direction of the third optically-anisotropic layer and a twisted direction of the optical axis derived from the liquid crystal compound in the thickness direction of the fourth optically-anisotropic layer are opposite to each other,
in a case where a length over which the direction of the optical axis derived from the liquid crystal compound in the liquid crystal alignment pattern rotates by 180° in a plane is set as a single period, a single period of the liquid crystal alignment pattern in the first optically-anisotropic layer and a single period of the liquid crystal alignment pattern in the second optically-anisotropic layer are the same,
a single period of the liquid crystal alignment pattern in the third optically-anisotropic layer and a single period of the liquid crystal alignment pattern in the fourth optically-anisotropic layer are the same, and
the single period of the liquid crystal alignment pattern in the first optically-anisotropic layer and the single period of the liquid crystal alignment pattern in the third optically-anisotropic layer are different.

2. The transmissive liquid crystal diffraction element according to claim 1,
wherein a twisted angle of the optical axis derived from the liquid crystal compound in the thickness direction of each of the first optically-anisotropic layer to the fourth optically-anisotropic layer is less than 360°.

3. The transmissive liquid crystal diffraction element according to claim 2,
wherein in at least one combination among a combination of the first optically-anisotropic layer and the second optically-anisotropic layer and a combination of the third optically-anisotropic layer and the fourth optically-anisotropic layer, the single period of the liquid crystal alignment pattern gradually changes in one direction.

4. The transmissive liquid crystal diffraction element according to claim 2, further comprising:
a C-plate that is provided between any of the first optically-anisotropic layer to the fourth optically-anisotropic layer.

5. The transmissive liquid crystal diffraction element according to claim 2, wherein in at least one combination among a combination of the first optically-anisotropic layer and the second optically-anisotropic layer and a combination of the third optically-anisotropic layer and the fourth optically-anisotropic layer, the liquid crystal compound of one optically-anisotropic layer is a rod-like liquid crystal compound, and the liquid crystal compound of the other optically-anisotropic layer is a disk-like liquid crystal compound.

6. The transmissive liquid crystal diffraction element according to claim 1,
wherein each of the first optically-anisotropic layer to the fourth optically-anisotropic layer has the liquid crystal alignment pattern in a radial shape.

7. The transmissive liquid crystal diffraction element according to claim 6,
wherein a difference between a reciprocal of the single period of the liquid crystal alignment pattern in the first optically-anisotropic layer and a reciprocal of the single period of the liquid crystal alignment pattern in the third optically-anisotropic layer gradually increases from a center portion toward an outer side portion of the radial liquid crystal alignment pattern.

8. The transmissive liquid crystal diffraction element according to claim 7, further comprising:
a C-plate that is provided between any of the first optically-anisotropic layer to the fourth optically-anisotropic layer.

9. The transmissive liquid crystal diffraction element according to claim 7,
wherein in at least one combination among a combination of the first optically-anisotropic layer and the second optically-anisotropic layer and a combination of the third optically-anisotropic layer and the fourth optically-anisotropic layer, the liquid crystal compound of one optically-anisotropic layer is a rod-like liquid crystal compound, and the liquid crystal compound of the other optically-anisotropic layer is a disk-like liquid crystal compound.

10. The transmissive liquid crystal diffraction element according to claim 6,
wherein in at least one combination among a combination of the first optically-anisotropic layer and the second optically-anisotropic layer and a combination of the third optically-anisotropic layer and the fourth optically-anisotropic layer, the single period of the liquid crystal alignment pattern gradually changes in one direction.

11. The transmissive liquid crystal diffraction element according to claim 6, further comprising:
a C-plate that is provided between any of the first optically-anisotropic layer to the fourth optically-anisotropic layer.

12. The transmissive liquid crystal diffraction element according to claim 6,
wherein in at least one combination among a combination of the first optically-anisotropic layer and the second optically-anisotropic layer and a combination of the third optically-anisotropic layer and the fourth optically-anisotropic layer, the liquid crystal compound of one optically-anisotropic layer is a rod-like liquid crystal compound, and the liquid crystal compound of the other optically-anisotropic layer is a disk-like liquid crystal compound.

13. The transmissive liquid crystal diffraction element according to claim 1,
wherein in at least one combination among a combination of the first optically-anisotropic layer and the second optically-anisotropic layer and a combination of the third optically-anisotropic layer and the fourth optically-anisotropic layer, the single period of the liquid crystal alignment pattern gradually changes in one direction.

14. The transmissive liquid crystal diffraction element according to claim 13,
wherein a difference between a reciprocal of the single period of the liquid crystal alignment pattern in the first optically-anisotropic layer and a reciprocal of the single period of the liquid crystal alignment pattern in the third optically-anisotropic layer gradually increases from a center portion toward an outer side portion of the radial liquid crystal alignment pattern.

15. The transmissive liquid crystal diffraction element according to claim 13, further comprising:
a C-plate that is provided between any of the first optically-anisotropic layer to the fourth optically-anisotropic layer.

16. The transmissive liquid crystal diffraction element according to claim 13,
wherein in at least one combination among a combination of the first optically-anisotropic layer and the second optically-anisotropic layer and a combination of the third optically-anisotropic layer and the fourth optically-anisotropic layer, the liquid crystal compound of one optically-anisotropic layer is a rod-like liquid crystal compound, and the liquid crystal compound of the other optically-anisotropic layer is a disk-like liquid crystal compound.

17. The transmissive liquid crystal diffraction element according to claim 1, further comprising:
a C-plate that is provided between any of the first optically-anisotropic layer to the fourth optically-anisotropic layer.

18. The transmissive liquid crystal diffraction element according to claim 1,
wherein in at least one combination among a combination of the first optically-anisotropic layer and the second optically-anisotropic layer and a combination of the third optically-anisotropic layer and the fourth optically-anisotropic layer, the liquid crystal compound of one optically-anisotropic layer is a rod-like liquid crystal compound, and the liquid crystal compound of the other optically-anisotropic layer is a disk-like liquid crystal compound.

19. The transmissive liquid crystal diffraction element according to claim 2,
wherein each of the first optically-anisotropic layer to the fourth optically-anisotropic layer has the liquid crystal alignment pattern in a radial shape.

20. The transmissive liquid crystal diffraction element according to claim 19,
wherein a difference between a reciprocal of the single period of the liquid crystal alignment pattern in the first optically-anisotropic layer and a reciprocal of the single period of the liquid crystal alignment pattern in the third optically-anisotropic layer gradually increases from a center portion toward an outer side portion of the radial liquid crystal alignment pattern.

* * * * *